(12) United States Patent
Ginetti

(10) Patent No.: US 6,622,291 B1
(45) Date of Patent: Sep. 16, 2003

(54) METHOD AND APPARATUS FOR PHYSICAL BUDGETING DURING RTL FLOORPLANNING

(75) Inventor: Arnold Ginetti, Antibes (FR)

(73) Assignee: Cadence Design Systems, Inc., San Jose, CA (US)

(*) Notice: Subject to any disclaimer, the term of this patent is extended or adjusted under 35 U.S.C. 154(b) by 148 days.

(21) Appl. No.: 09/702,090

(22) Filed: Oct. 30, 2000

(51) Int. Cl.[7] .............................................. G06F 17/50
(52) U.S. Cl. ........................................................ 716/9
(58) Field of Search ................................ 716/2, 6, 8, 9, 716/12, 18

(56) References Cited

U.S. PATENT DOCUMENTS

| | | | |
|---|---|---|---|
| 5,870,308 A | 2/1999 | Dangelo et al. | |
| 6,360,356 B1 * | 3/2002 | Eng | 716/18 |
| 6,438,731 B1 * | 8/2002 | Segal | 716/2 |
| 6,496,972 B1 * | 12/2002 | Segal | 716/18 |

* cited by examiner

*Primary Examiner*—Matthew Smith
*Assistant Examiner*—Thuan Do
(74) *Attorney, Agent, or Firm*—Reed Smith Crosby Heafey LLP; John W. Carpenter

(57) ABSTRACT

A feasible floorplan of a circuit is determined and budgeted in the early phases of circuit design. The process of determining the floorplan and budget includes estimating RTL complexity, physical partitioning, block placement, block i/o placement and top level global routing, and verifying feasibility of the floorplan. Allocation of global timing constraints to each block is performed by producing logic cones representing timing of circuit paths in each block. The circuit paths are optimized to determine a feasible timing for each block. The global constraints are allocated proportionally to each block based on the feasible timing for each block.

18 Claims, 12 Drawing Sheets

Physical Hierarchy  Logical Hierarchy

Model Delay Curve (MDC)  Realistic Delay Curve (RDC)

1. set budgetted arc delay to zero
2. set arc weight as a function of the fastest implementation of their flexible part
3. propagate arrival time, back-propagate required time
4. propagate arc weight
5. while there are congested cone/buffer tree{
6.     distribute slack in congested cone/buffer tree
7.     update weight in congested cone/buffer tree
8.     propagate arrival time, back-propagate required time
9.     propagate arc weight
10. }
11. distribute some % of positive slack to flexible arcs
12. copy budgeted delays to realistic delays
13. set arc weight as a function of frozen arc delay
14. propagate weights
15. propagate arrival time, back-propagate required time
16. while there are negative slack {
17.     distribute negative slack
18.     propagate arrival time, back-propagate required time
19. }

FIG. 20

1. for each not yet visited input from the fastest one to the slowest one
2.     if ds <= mdc
3.         bdc = mdc; visit input;
4.     else
5.         pick contiguous following inputs up to the one whose ds < mdc
6.         bdc = median (mdc); visit inputs;

FIG. 22

1. reset all arc weights
2. set top level net arc weight to the square root of the fanout
3. propagate weights
4. propagate arrival time, back-propagate required time
5. while there are positive slack {
6.     distribute positive slack
7.     propagate arrival time, back-propagate required time
8. }

FIG. 24

Physical Hierarchy        Logical Hierarchy

| | |
|---|---|
| 0 | adapt arc delay with new parasitics |
| 1 | copy rdc to bdc |
| 2 | distribute some % of positive slack to flexible arc |
| 3 | copy bdc to rdc |
| 3 | set arc weight as a function of frozen arc delay |
| 4 | propagate weights |
| 5 | propagate arrival time, back-propagate required time |
| 6 | while there are negal slack { |
| 7 |     distribute negative slack |
| 8 |     propagate arrival time, back-propagate required time |
| 9 | } |
FIG. 26
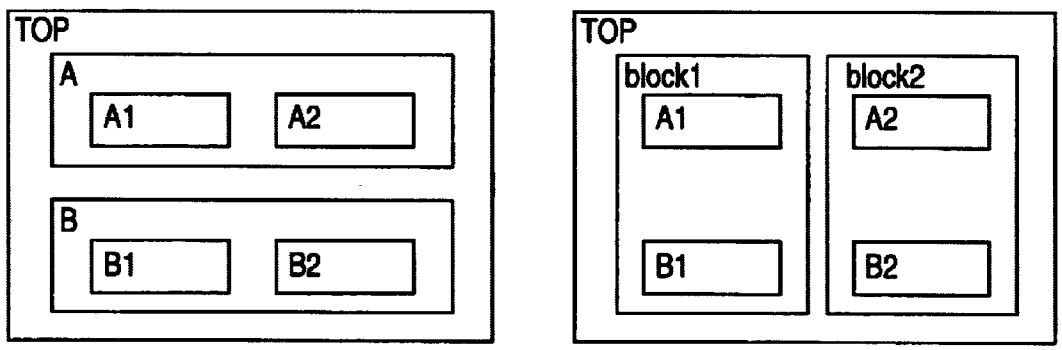
FIG. 27
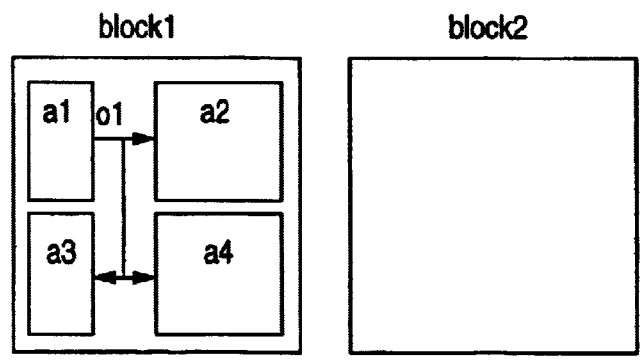
FIG. 28

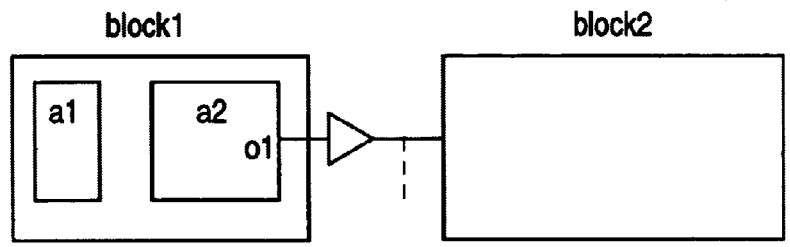
FIG. 29
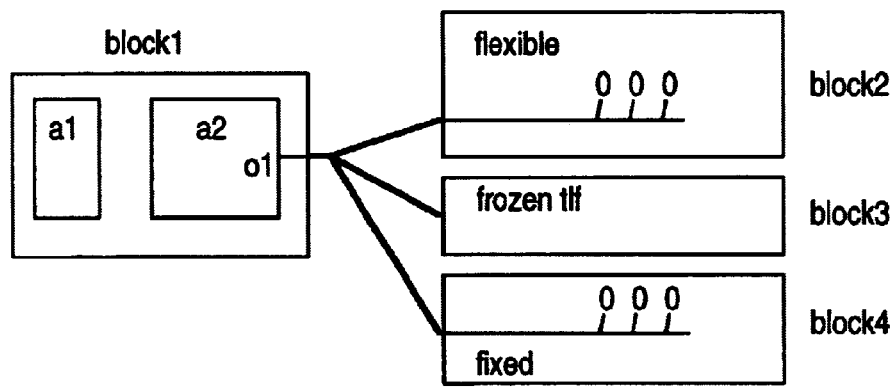
FIG. 30
| | |
|---|---|
| 1 | RTL design loading |
| 2 | estimation |
| 3 | timing initialization |
| 4 | Physcal budgeting |
| 5 | timing driven partitioning |
| 6 | timing driven block placement |
| 7 | (incremental) reloading some RTL cells |
| 8 | (incremental) estimation |
| 9 | timing initialization |
| 10 | (incremental) Physical budgeting |
FIG. 31

METHOD AND APPARATUS FOR PHYSICAL BUDGETING DURING RTL FLOORPLANNING

BACKGROUND OF THE INVENTION

1. Field of Invention

The present invention relates generally to a method and system for synthesizing a circuit design. More particularly, the invention relates to a method and system for concurrently synthesizing different parts of a circuit design (blocks) by using budgeting techniques to determine a feasible floor plan for the blocks and perform timing and logic design rules constraints allocation to the blocks.

2. Discussion of Background

Most conventional synthesis tools available to designers are able to handle circuit designs whose size can be up to predetermined number of gate equivalents (100,000, for example). A designer working on a chip with greater than the predetermined number of gate equivalents has to manually partition the circuit design into smaller pieces (e.g., sub-blocks) in order for conventional synthesis tools to operate on the entire circuit design. In addition, partitioning may also be performed to allocate block design tasks to different teams, breaking the circuit design project into smaller, more manageable components. A design with sub-blocks is also referred to as a hierarchical design. Partitioning the circuit design into small sub-blocks is a common procedure for designers and allows conventional synthesis tools to synthesize the entire circuit design.

However, in the above procedure, it is difficult to convert the timing and logic design rules constraints from a top-level view of the chip into local constraints applied to the sub-blocks. The local budgeted constraints are the result of an allocation which provides a nominal timing performance to the sub-blocks. Allocation of timing and logic design rules is needed in order to load the sub-blocks in the synthesis tools and run several sub-block synthesis (eventually in parallel) instead of one full synthesis run on the whole design.

The operation of converting global constraints into local constraints applied to a sub-block is referred to as the characterization of the corresponding sub-block. The operation of converting the global constraints into budgeted local constraints is referred to as the timing and logic design rules constraints allocation.

The timing and logic design rules constraints allocation to a sub-block is useful when a team leader would like to assign each of his engineers to the synthesis of one sub-block. The engineers will work in parallel and each of them will need the timing and logic design rules constraint allocated to his respective sub-block. In this situation, the timing and logic design rules constraints allocation of the sub-blocks should provide the scripts of the synthesis. As a result, this operation has to be done before the synthesis itself.

For a more detailed discussion of the above situation with respect to RTL Floorplanner tools, reference is made to co-pending U.S. application Ser. No. 08/921,361, titled "Method and System for Floorplanning a Circuit Design at a High Level of Abstraction," filed on Aug. 29, 1997, the content of which is hereby incorporated by reference in its entirety.

Allocation of timing can be performed arbitrarily, simply assigning an amount of total time to each of the blocks or sub-blocks, evenly dividing the total time between blocks, or allocation based on a formula. One example of timing allocation from global constraints to local block/sub-block constraints is provided by Ginetti et al., U.S. Pat. No. 6,086,621 ('621), which is incorporated herein by reference, in its entirety. In Ginetti ('621), allocation of timing budgets is taught using a formula taking into account path lengths of actual and budgeted gates. However, each of the known timing allocation techniques to sub-blocks, whether arbitrary, evenly distributed, or by formula, are not accurate, causing some blocks to be under-constrained, and others to be over-constrained.

SUMMARY OF THE INVENTION

The present inventor has realized that high level circuit designs (RTL, for example) from which block placement, interblock timing, etc., are in need of better budgeting, particularly in the early phases of circuit design so that feasible floorplans and timing constraints within and between blocks can be allocated.

The present invention provides a Physical Budgetor that produces a feasible budgeted optimal floorplan out of an RTL description and determines a set of timing constraints for blocks of the floorplan. The floorplan is a set of placed physical blocks, placed physical block i/o, placed external i/o, global routed top level wire, and correspondence between the physical blocks and an initial logical hierarchy. The Physical Budgetor also generates a set of budgeted constraints for each block. These budgeted constraints correspond to a timing estimation and distribution performed by the Physical Budgetor when generating the floorplan. By feasible, we mean that classical synthesis and Place and Route (P&R) tools should be able to implement the RTL description within that floorplan while respecting the timing constraints. If the timing constraints are too tight, the Physical Budgetor advises the user on candidates for modification (modify some RTL descriptions or give up some timing constraints, for example). By optimal, we mean that floorplan should be as small as possible. In one embodiment, the Physical Budgeter produces the floorplan from an RTL description and some constraints, using the following steps:

1) estimate the complexity of the RTL description;
2) perform a physical partitioning, that is generate a list of interconnected physical blocks out of a hierarchical netlist of RTL cells;
3) perform a block placement;
4) perform block i/o placement and top level global routing; and
5) verify that the floorplan is likely to be feasible.

Each of the above steps are performed via the Physical Budgetor, a single tool, having a global view of block timing/global timing and floorplanning, where each of the CPU intensive steps are replaced by fast and accurate estimators (during initial estimation and beginning iterations).

Once the blocks are placed, the present invention performs allocation of timing between the various blocks determining a solid estimate of timing required to implement the block. The timing allocation is determined by identifying logic cones from gates of an un-optimized netlist produced from the RTL. The logic cones are then used to adjust timing and determine a basic high level optimization of the gates, resulting in a solid approximation of block timing. Then, a portion of the global timing constraints are allocated to each block based on the approximate block timing. A similar process is applied to estimate RTL complexity and partition the blocks.

The invention may be embodied in a method of determining a budgeted floorplan of a circuit, comprising the steps of, initializing timing of said circuit, performing a physical budgeting of said circuit, partitioning said circuit into blocks of gates, identifying placement of said blocks, and budgeting time to each of said blocks. The invention also includes budgeting time to each of the blocks, which may be performed by a method of allocating global timing constraints of a circuit across blocks of said circuit, comprising the steps of providing an RTL or other high level description of each block, developing an un-optimized netlist for each sub-block from said RTL, producing a set of logic cones from the un-optimized netlist for each block that identify timing arcs within each block, optimizing the timing arcs within each block using said logic cones, and allocating said global timing constraints to each block based on the optimized timing arcs in each block.

The present invention provides many advances over prior systems, including, but not limited to, a powerful and accurate flexible timing model to model the timing behavior of the combinatorial pieces of the initial RTL description; capability to run a real timing driven partitioning before entering the long synthesis iterations; capability to run a real timing driven block placement before entering the long synthesis iterations; capability to run a real top level net global routing before entering the long synthesis iterations; and capability to run a real timing driven top level buffer insertion before entering the long synthesis iterations. The various processes and techniques of the present invention are described herein with reference to commands available as implemented in a tool (Integration Ensemble) for performing circuit synthesis. However, it should be understood that each of the processes discussed herein may be applied in different types of tools individually or in combination with other processes or devices.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 20 is a program design flow for a Physical Budgeting;

FIG. 22 is a program design flow of a process to distribute the slack in a congested cone;

FIG. 24 is a program design flow for a wire budgeting process;

FIG. 26 is a program design flow for a Time Budgeting process (Final Budgeting).

FIG. 27 is an example of physical partitioning of a design;

FIG. 28 is an illustration of an output node enclosed within a physical block;

FIG. 29 is an illustration of an output node that drives a top level interconnect;

FIG. 30 is an illustration of an output node that drives a non-buffered top-level net; and FIG. 31 is an example of one process for incremental modification.

DESCRIPTION OF THE PREFERRED EMBODIMENTS

Figure 1:
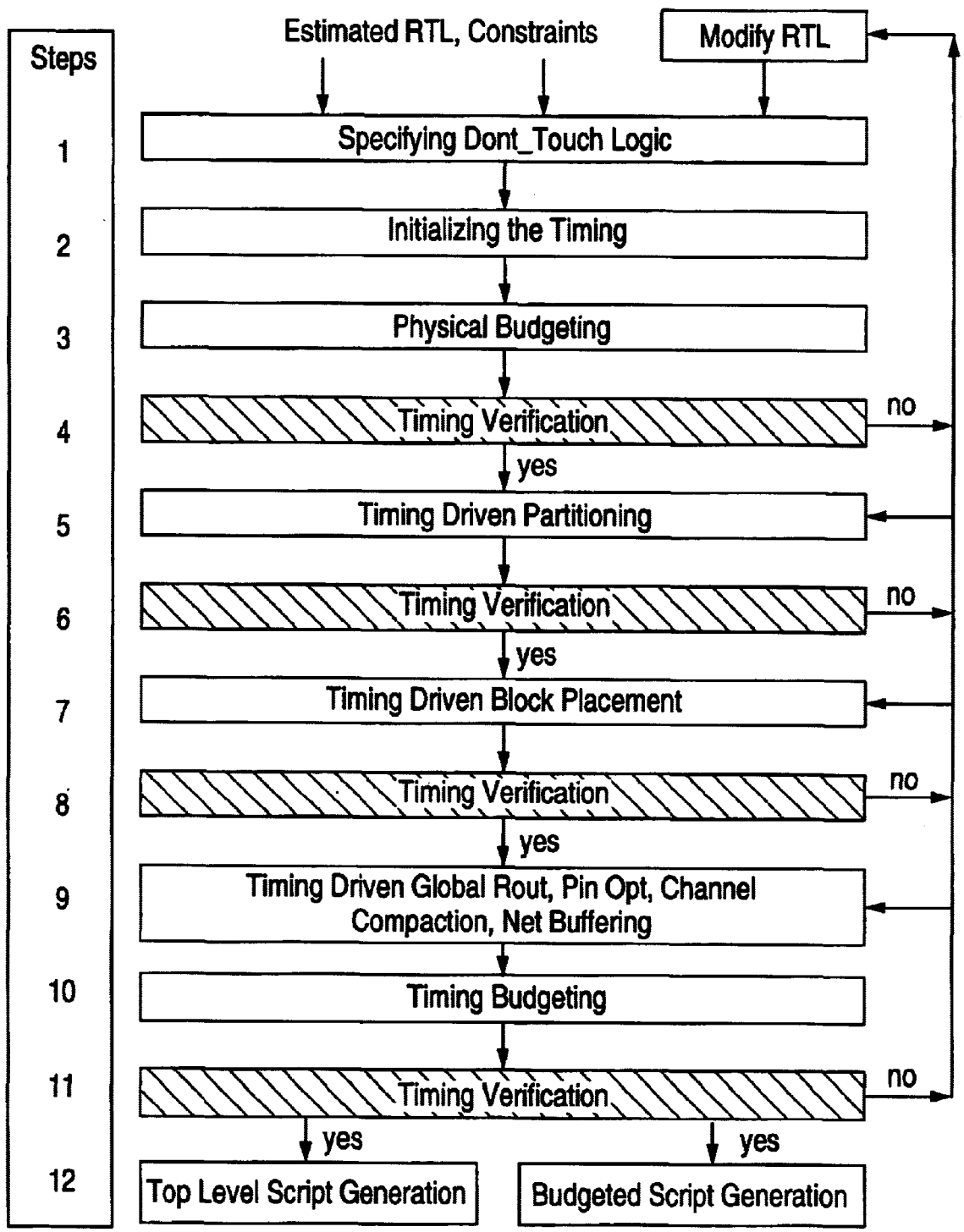
FIG. 1 is a high level flow chart of a Timing Optimization loop starting from an "Estimated RTL" and a set of constraints.

In circuit design, inter-block timing is a function of the floorplan upon which the blocks are arranged (timing paths change with different placements of the blocks and gates), and inter-block parasitics.

The process of determining a floorplan is a loop comprising the steps of:

1) estimate the complexity of the RTL description;
2) perform a physical partitioning, that is generate a list of interconnected physical blocks out of a hierarchical netlist of RTL cells;
3) perform a block placement;
4) perform block i/o placement and top level global routing; and
5) verify that the floorplan is likely to be feasible.

At any point if a design or timing consideration is found to be impossible, the steps are repeated with adjustments accounting for the problem making the previous iteration not possible.

However, these tasks have many interdependencies, including:
1) the complexity of the RTL description is depending upon the timing constraints and the parasitics; but the intra-block parasitics are known after the block placement, while the inter-block parasitics are known after global routing; The complexity itself can be obtained either by running estimation or by doing timing driven synthesis. The trade-off is the cpu versus the accuracy;
2) the physical partitioning is dependent upon the logical cell complexity, and on the timing constraints. But checking the timing constraints needs the knowledge of the parasitics;
3) the block placement depends upon the partitioning (which in turn depends upon the RTL cell complexity) and the timing constraints. But checking the timing constraints needs the knowledge of the parasitics; and
4) block i/o placement and top level global routing depends upon the block placement and timing constraints. But checking the timing constraints needs the knowledge of the parasitics.

Therefore, since the previously described steps are depending upon each other, the present inventor has determined that the best way to enter the loop is by doing an estimation of the performance of the subsequent steps. The selection of the entry point and the estimation done at that entry point is done in a way that minimizes the number of iterations and the risk of nonconvergence. One question facing a designer is that when implementing huge timing critical designs, is it better to estimate the design complexity using parasitics of an unknown partitioning, block placement, top level global routing, or is it better to do a partitioning, block placement, global routing on a non estimated design?

In order to address that question, let's assume that the ideal size of a physical block is known up front. That assumption is based on the "Critical Block" theory that given a technology, and given the number of metal layers used for intra-block routing, there is a critical block size beyond which all the wire within the block are NOT resistive. Below that critical block size, block delays are mainly driven by gate delays (which also depend upon the wire capacitance). Therefore, on a timing performance perspective, it is a good idea to keep the block size below that critical size.

A block whose size equals that critical size is called a critical block. In current technologies (0.2 µm), such a critical block would contain 50 k to 100 k gates. A properly designed floorplan would minimize the number of block interconnections on the design critical path. This helps to keep the critical path delay as a function of the gates (that is the functionally) as opposed to be a function of both the gates and the wires. Put in other words, ideally, all critical paths should be totally subsumed in one critical block.

Assuming that we can estimate the parasitics of a critical block from its size, the loop is entered by estimating the design complexity based on this critical block parasitic model. That is, for a multi-million gate design, estimate the complexity of the design while using a 100 k block parasitic model. However, that model is optimistic for at least two reasons: 1) it does not take into account that some blocks might be bigger than 100 k; 2) it does not take into account inter-block delay. As a side effect, the timing verification based on these optimistic parasitic model will up-front help the designer to find out whether the design is feasible (there is no point to go any further if the design can not meet the timing constraints while using these best case parasitics)(the timing verification verifies that the design is working at the right frequency, given by the user as a set of timing constraints. The Timing Verification is based on timing estimation, for instance it estimates the net wire delay as long the wires are not yet existing).

For design purposes, block-based parasitics can be estimated using wire load models. Wire load models are usually not a good way to estimate the parasitics in the context of an optimization tool. However, they properly model the wire capacitance in the context of an estimation tool, whose main target is to find out whether a given implementation is likely to run at the right frequency once the P&R is completed.

| | Definitions |
|---|---|
| CTE | Common Timing Engine |
| DCF | Disjunctive Canonical Form |
| IE | Integration Ensemble, a tool designed to perform the circuit design steps discussed herein. |
| Fixed logic | the part of a design which are not subject to be changed by a synthesis tool. |
| Flexible logic | the part of a design which are subject to be changed by a synthesis tool. |
| Flexible Timing Edge Graph | Edge graph which contains some flexible logic. |
| Flexible timing path | a timing path which at least contains one flexible logic cell. |
| ATC | Ambit Timing Constraint(s) ※ a set of one or more constraints (general contraints, timing, for example) to which the circuit being designed must conform. |
| Hardly flexible timing path | a timing path that does contain very few flexible logic |
| Highly flexible timing path | a timing path that contains a lot of flexible logic. |
| IMP | Iterative Minimax Pert |
| MDC | Model Delay Curve, a WLM dependent curve which relates the delay of arcs of an unbalanced n input cone/buffer tree to the n inputs of that cone/buffer tree. |

0.3 IE Timing Optimization Loop

Referring now to the drawings, wherein like reference numerals designate identical or corresponding parts, and more particularly to FIG. 1 thereof, there is illustrated a Timing Optimization loop starting from an "Estimated RTL" and some constraints. The loop has the following steps:

Step 1: don't_touch log is specified instances which should considered as fixed logic (don't touch) during the budgeting. The RTL is not set as dont_touch. The structural netlist are by default set as dont_touch, but the user can clear that attribute. The Timing Model is considered as dont_touch.

Step 2: The designer initializes IE timing optimization loop, with both the estimated/inferred RTL and a ATC file giving the timing constraints. During that initialization, are created the flexible timing models are created.

Step 3: Design physical budgeting, composed of three phases:
(1) Parasitics are estimated on a critical block size estimation; This phase only needs to be performed if the designer did not verify the design before budgeting the design.

(2) Gate Delay and Flexible Model Delay calculation as a function of the parasitics. Again, this phase only needs to be performed if the designer did not verify the design before budgeting the design.

(3) Using these parasitic models, IE runs a physical budgeting. That is IE mimics a logic optimization tool in order to estimate the gate complexity of an implementation of the RTL description meeting the given timing constraints; Note that this physical budgeting does not consume all the available slack. Some slack is reserved for inter-block delays. The reserved slack will be used during physical partitioning, block placement and the global routing.

Step 4: Timing verification is performed in three phases:
(1) Parasitics are estimated on a critical block size estimation; Note that if these parasitics have been estimated in a previous step, and are still valid, there is no point to re-estimate them.
(2) Gate Delay and Flexible Model Delay calculation as a function of the parasitics. Note that if these gate delays have been estimated in a previous step, and are still valid, there is no point to re-compute them.
(3) IE checks the results of logic optimization done during the budgeting: If the timing is not met, there is no point to go any further in the floorplanning: it is rather necessary to change the specification of the design. If the timing is met, IE goes to step 5.

Step 5: A timing driven partitioning is performed in three phases:
(1) Parasitics are estimated on a critical block size estimation; Note that if these parasitics have been estimated in a previous step, and are still valid, there is no point to re-estimate them.
(2) Gate Delay and Flexible Model Delay calculation as a function of the parasitics. Note that if these gate delays have been estimated in a previous step, and are still valid, there is no point to re-compute them.
(3) In a nutshell, the timing driven partitioning avoids top level critical nets; that is, the timing driven partitioning tries to enclose set of interconnected critical paths into the same physical block, smaller than the critical block size.

Step 6: A timing verification performed in three phases:
(1) Parasitics are estimated as a function of the partitioning. Nets totally enclosed within a physical block will get a parasitic model based on the complexity of the block (which might be different from the model estimated in Step 3); and the top level physical net (that is inter-block net) will get a parasitic model which is a function of the global design complexity.
(2) Gate Delay and Flexible Model Delay calculations are performed as a function of the parasitics.
(3) Check the results of logic optimization done during the budgeting: If the timing is not met, there is no point to go any further in the floorplanning. In this case, it is necessary to change the specification of the design. If the timing is met, IE goes to step 7.

Step 7: Timing driven block placement performed in three phases:
(1) Parasitics are estimated as a function of the partitioning; Note that if these parasitics have been estimated in a previous step, and are still valid, there is no point to re-estimate them.
(2) Gate Delay and Flexible Model Delay calculation as a function of the parasitics. Note that if these gate delays have been estimated in a previous step, and are still valid, there is no point to re-compute them.
(3) The block placement is timing driven thanks to net weights generated from time budget on top level physical nets. Weights are high when the net belongs to a hardly flexible timing path, that is a path which would be difficult to further optimize from a logic synthesis point of view. Weights are small when the net belongs to a highly flexible timing path, that is a path which can still be further optimized from a logic synthesis point of view. Block placement is thus consuming some of the path flexibility.

Step 8: Timing verification performed in three phases:
(1) Parasitics are estimated as a function of the block placement. On the one hand, intra-block parasitics are now a function of both the block complexity and the block aspect ratio; on the other hand, inter-block parasitics are a function of the block position (for instance center to center Steiner tree estimation).
(2) Gate Delay and Flexible Model Delay calculation as a function of the parasitics.
(3) IE checks the results of logic optimization done during the budgeting: If the timing is not met, there is no point to go any further in the floorplanning: it is rather necessary to change the specification of the design. If the timing is met, IE goes to step 9.

Step 9: The user runs a timing driven routing and i/o placement performed in four phases:
(1) Parasitics are estimated as a function of the block placement. Note that if these parasitics have been estimated in a previous step, and are still valid, there is no point to re-estimate them.
(2) Gate Delay and Flexible Model Delay calculation as a function of the parasitics. Note that if these gate delays have been estimated in a previous step, and are still valid, there is no point to re-compute them.
(3) IE creates timing budget for inter-block net. The inter-block net timing budget are based on the flexibility of the paths containing the nets.
(4) IE runs Global routing, block terminal assignment, channel compaction, net buffering; This is again consuming some of the path flexibility.

Step 10: Time Budgeting. The goal of time budgeting is to re-distribute the slack after the global routing, now that the top level net delays are known. That time budgeting is done in three phases:
(1) Parasitics are estimated as a function of the global routing. Note that if these parasitics have been estimated in a previous step, and are still valid, there is no point to re-estimate them.
(2) Gate Delay and Flexible Model Delay calculation as a function of the parasitics. Note that if these gate delays have been estimated in a previous step, and are still valid, there is no point to re-compute them.
(3) IE runs a time budgeting. The main difference between the physical budgeting and the time budgeting is the fact that the time budgeting does not book any slack for the "physical effects".

Step 11: Report Timing. Timing verification is done in three phases:
(1) Parasitics are estimated as a function of the global routing. Note that if these parasitics have been estimated in a previous step, and are still valid, there is no point to re-estimate them.
(2) Gate Delay and Flexible Model Delay calculation as a function of the parasitics. Note that if these gate delays have been estimated in a previous step, and are still valid, there is no point to re-compute them.

(3) IE runs a timing verification.

Step 12: Here the designer has options:
  (1) Generate budgeted synthesis script for any selected hierarchical logical instance. He would then load these scripts within his favorite synthesis tools and implement concurrently each of the selected logical cells.
  (2) As an alternative, the designer can just save the user specified top level timing constraints together with a top-level Standard Delay Format (SDF) file keeping track of the inter-block delays and a wireloadmodel file containing the wireloadmodels to be used inside each of the physical block. In this case, he would load the complete design together the just listed files within the synthesis tool and could try some optimization without using any budgeting (for example, optimize the shells first). In this case, the time budgeting was not necessary.

Note also that the budgeting may also use some classical synthesis algorithms embedded inside IE. The budgeting could thus be replaced by a real logic synthesis timing optimization which would then transform IE into a next generation synthesis tool. The difference between optimization and budgeting is the CPU/accuracy trade-off. It is also possible that budgeting can be followed by a logic optimization, which would somehow confirm budgeting results. At the end of a session (complete iteration of the loop), one would then produce a floorplanned placed&optimized netlist, instead of synthesis scripts. (Note that in such a case, one would need a Boolean Optimizer as opposed to a quick Boolean Optimizer for estimating the RTL).

1. Timing Optimization Loop Steps

In this section, we review one by one the different steps of the IE Timing Optimization Loop.

1.2 Estimated RTL

The only assumption we make here is that a Boolean optimization will try to produce an as small as possible boolean network, then to map it in a balanced way, with a limit of 4 for both the fanin (maximum number of input of any gate in the design) and fanout (maximum number of inst_terminal driven by any gate in the design). The fanin limitation will prevent the mapper from using big gates with large numbers of transistors in series. The fanout limitation will prevent the mapper from letting highly capacitive node driven by small buffer gate. This will ensure that the timing verification done in a later step will be meaningful.

1.3 Specifying Dont_touch Instance

As stated above, fixed logic is not subject to be modified by the downstream implementation tool. Thus, fixed logic is not budgeted. Examples of candidates for fixed logic include, the timing models, the pads, the black boxes, and gates touched by a ATC constraint (for instance, a gate whose timing arcs have been broken by a ATC constraint).

The gate level netlists are user specified as fixed logic with the help of the "set dont_touch" command. By default, all gate level netlists are considered as fixed, that is, all gate level netlists do have the dont_touch attribute. The user can clear this attribute with the help of the "clear dont_touch" command.

As stated above, flexible logic is subject to be modified by the downstream implementation tool. Flexible logic is thus always budgeted. Examples of flexible logic include:

n all RTL netlists, transformed into gate level netlist, excepting the gate touched by a ATC constraint.
  n the gate level netlists not set as dont_touch by the user, excepting the gate touched by a ATC constraint.

The "set dont_touch" command (IE) is used for budgeting a design, to keep specified parts of the design from being budgeted.

1.4 Initializing the Timing

A Timing edge graph is a data structure generated by a timing verifier on the top of a given netlist in order to run a timing verification process. A Flexible Timing Edge graph is defined as an edge graph which contains some flexible logic; a flexible Timing edge graph might also contain some fixed logic.

Figure 2:
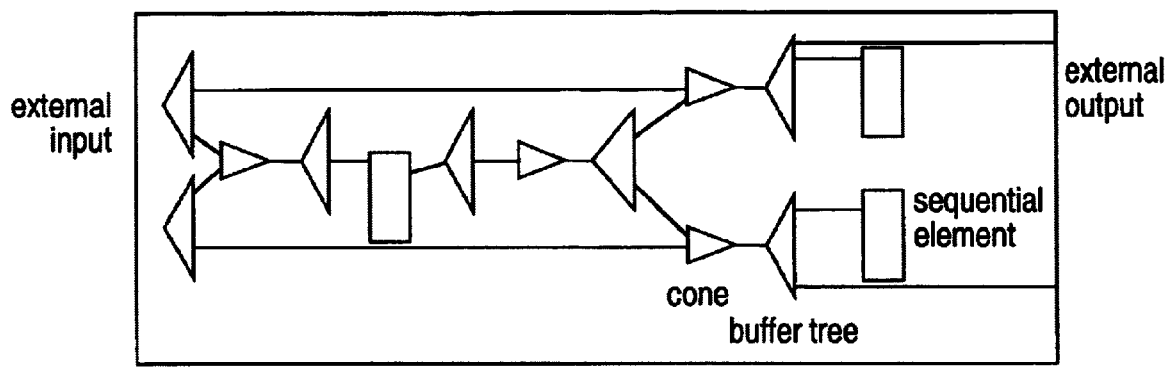
FIG. 2 is a graphical illustration of a modeled flexible cell composed of fanout free cones of logic, buffer trees, and sequential elements.

The goal of the timing initialization is to generate a flexible timing edge graph out of the hierarchical netlist database generated by the estimator. The flexible edge graph is automatically generated from the estimated netlist by the Common Timing Engine and by detecting the flexible part of the design. In one embodiment, this is performed by:

n loading Ambit Timing Constraints (from a file, for example); this is done by offering to CTE a view of the netlist database, then by giving to CTE the name of the Ambit Timing Constraint file to be loaded. CTE first builds a non-flexible edge graph, then parses the Ambit Timing Constraint file and generate an Ambit Timing Constraint object and attaches them to the netlist components.
  n detect the flexible part of the design; this is done by looking at the dont_touch attribute set by the user and at the CTE API to get the Ambit Timing Constraint-touched objects.
  n model the flexible parts of the design; FIG. 2 sketches a IE-modeled flexible cell. That IE-modeled flexible cell is composed of three types of elements:
    fanout free cones of logic;
    buffer trees;
    sequential elements.
  In case some combinational cell was touched by a Ambit Timing Constraint, then it would be "visible" as the sequential elements.
  n transform the non-flexible edge graph into a flexible edge graph. This is done by creating a Timing Library Format (TLF) model for each of the flexible elements, and to replace the initial set of gates by that TLF model. (Note that this would help to give to CTE the input inst_terminal capacitance of a flexible model).

In the following sub-sections, we present how to model the flexibility of the buffer tree and the flexibility of the cone of logic. These are technology independent models.

1.4.1 Flexibility of the Buffer Trees

Figure 3:
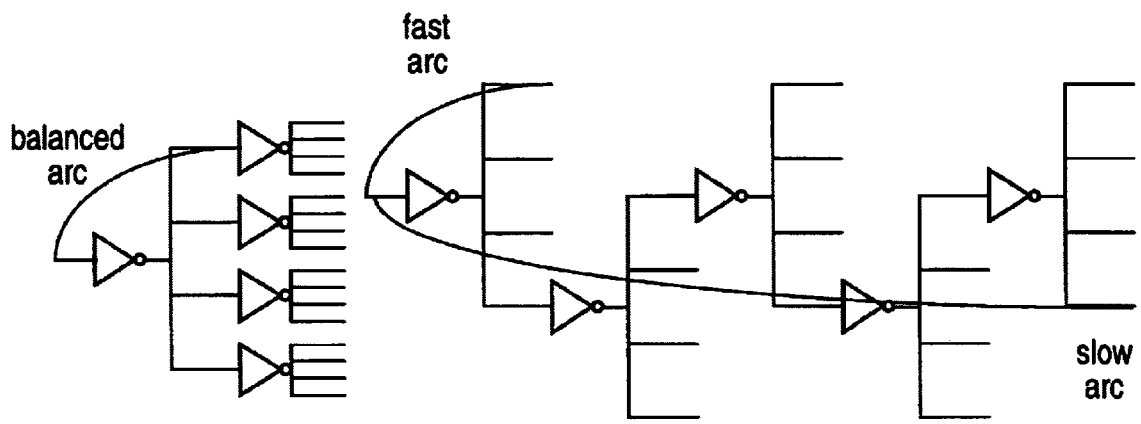
FIG. 3 is an illustration of a balanced and unbalanced buffer tree.

According to the applied timing constraints, buffer trees generated by classical synthesis tools can be balanced or unbalanced. For example, see "A fast Fanout Optimization Algorithm for Near-Continuous Buffer Libraries", D. Kung, DAC 98, and "A Heuristic Algorithm for the Fanout Problem", K. Singh, DAC 90. FIG. 3 presents both a balanced and unbalanced buffer tree. On a balanced buffer tree, all the input to output timing arcs have the same delay. On an unbalanced buffer tree, some arcs do have a short delay, some other arcs do have a longer delay.

Given:
  (1) that we know up-front the fanout limit fn to be used during the synthesis. That limit is often driven by the placement tool, and approximately equal to "4".

(2) that we have some model of the parasitics p for such a fanout; This is coming from the previous section.

(3) that we know the average input pin capacitance aipc of cells within a library (This is immediate);

(4) that after some library/technology calibration we know the fastest gate to drive a load corresponding to (fn*aipc)+p, and that the delay introduced by such a gate is dg.

Then, a delay estimation of an arc of a balanced buffer tree of fanout f is given by:

$$balancedBufferArcTreeDelay = dg * \log_{fn} f \tag{1}$$

Respecting the fanout limit, we know that it is possible to reduce the delay of (fn−1) arcs, if we accept to increase the delays of the remaining arcs:

$$acceleratedArcDelay = dg \tag{2}$$

$$slownDownArcDelay = dg + \log_{fn}(f-(fn-1)) \tag{3}$$

Figure 4:
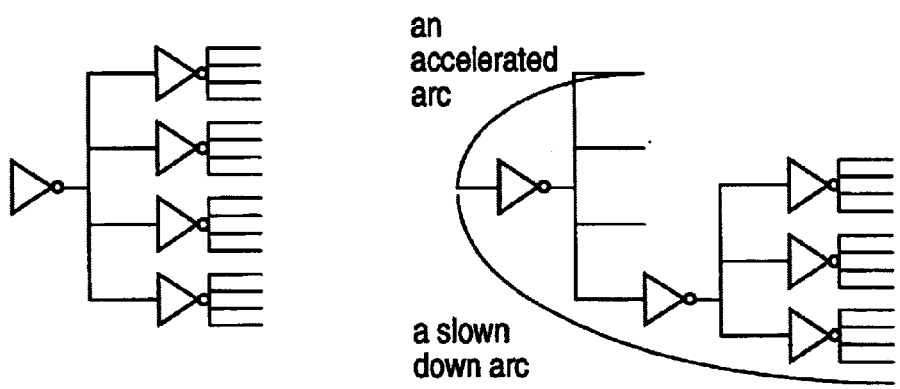
FIG. 4 is an illustration of a buffer tree having three arcs accelerated and a slow down of the remaining 13 arcs.

For instance, in the case of FIG. 4, where fn is assumed to be equal to 4, we accelerated three arcs and slew down the remaining 13 arcs.

1.4.1.1 Taking Into Account Hierarchical Instance Output Load

Figure 5:
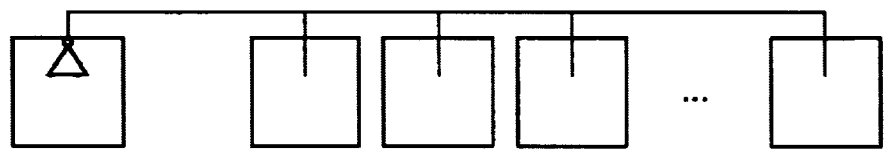
FIG. 5 is an illustration of a hierarchical instance output terminal that drives a scattered fanout.

Sometimes, a hierarchical instance output terminal might drive a scattered fanout as the one sketched the FIG. 5.

If we consider that both the inference and the estimation do not buffer that node at the top level, it is necessary to take into account the delay due to that heavily loaded net. This will be done by adding some incremental non-flexible delay on that output inst_terminal (This would correspond to a synthesis strategy which would not buffer the nodes at the upper level of hierarchy)

1.4.2 Flexibility of the Cones

The analysis of the flexibility of the cone is based on the "Theory of Logical Effort," hereinafter, Sutherland. According to that theory, the normalized delay through one gate can be modeled as:

$$D = gh + p \tag{4}$$

where:

g is the logical effort, and depends upon the function of the gate and the number of inputs of the gate. g is given for a lot of different gates in Sutherland;

h is the electrical effort and is equal to $C_{out}/C_{in}$, where $C_{out}$ is the output capacitance driven by the gate and $C_{in}$ is the input pin capacitance of the gate; and p is the parasitic delay and depends upon the structure of the gate and of the number of inputs of the gate and a function of $P_{inv}$, a standard inverter input pin capacitance that can be considered to be equal to 1·p is given for a lot of different gates in Sutherland.

In our case, within a cone of logic, we will consider:

$$C_{out} = C_{in} \tag{5}$$

We thus have:

$$D = g + p \tag{6}$$

The analysis of the flexibility of the cones depends upon the boolean function of the cone. Assuming that we represent the boolean function of the cone into a disjunctive canonical form (DCF), three cases arise:

(1) the DCF only contains one product;

(2) the DCF contains more than one product, but any input literal only appears once in the DCF; and (3) the DCF contains more than one product, but input literal may appear more than once in the DCF;

1.4.2.1 DCF Contains Only One Product

According to (6), the normalized delay of n-input nand gate is given by Sutherland:

$$D = (n+2)/3 + 2 \tag{7}$$

Figure 6:
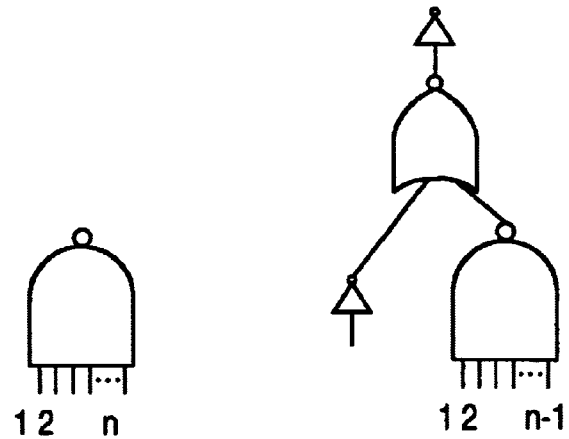
FIG. 6 is an illustration of accelerating an input of a gate.

Reducing the delay of one of the input of such a gate as sketched on the FIG. 6, we can easily compute that the delay of the accelerated input is:

$$D_{fast\_input} = delay(inv) + delay(\text{2-input nor gate}) \tag{8}$$

Ignoring the delay through the inverter (because it would be included in the buffer tree driving the cone), the theory of the logical effort gives:

$$D_{fast\_input} = 11/3 \tag{9}$$

In the same way, we can compute the -delay through the slowed down input to be:

$$D_{slow\_input} = delay(n-1 \text{ nand gate}) + delay(nor2) \tag{10}$$

The slow down delay, defined as:

$$D_{slow\_down} = D_{slow\_input} - D = 7/3 \tag{11}$$

The input of the (n−1)-input nand gate can be further accelerated by playing the same game. Assuming that we accelerate m input of the initial n-input nand gate, one would obtain that the delay of the $i^{th}$ accelerated input is defined by:

$$D_{fast\_input} = i * 11/3 \tag{12}$$

The delay of the remaining non accelerated (n−m) input is given by:

$$D_{slow\_input} = n*4/3 + 16/3 \tag{13}$$

And the slowdown delay is of these non-accelerated input is:

$$D_{slow\_down} = m * 7/3 \tag{14}$$

1.4.2.2 DCF Contains Several Products, but any Input Literal is Only Used Once Let's assume that the DCF contains n products, and that the $i^{th}$ product contains $n_i$ literals. The delay of an input to output arc of the ith product of a balanced implementation can be computed as:

$$D = delay(n_i \text{ input nand gate}) + delay(m \text{ input nand gate}) \tag{15}$$

That is:

$$D = 4/3 * (n+n_i) + 4/3 \tag{16}$$

Figure 7:
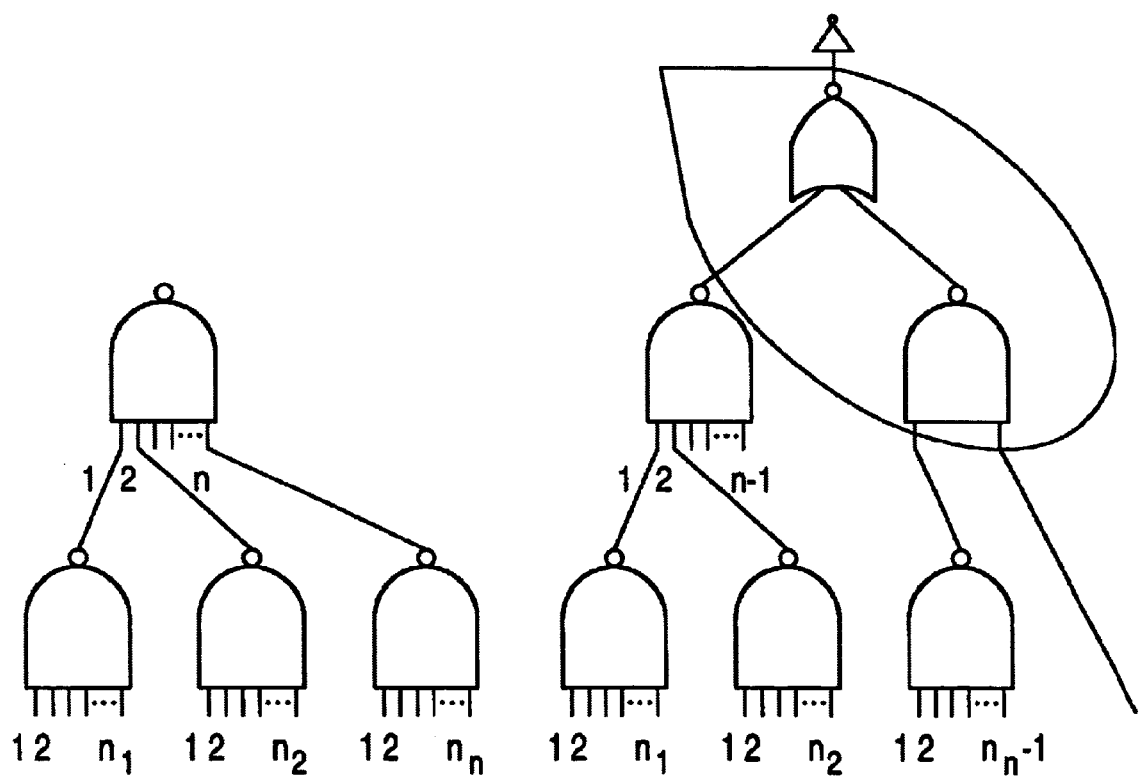
FIG. 7 is an illustration of a DCF having one input speeded up.

Now assuming that we speed up one of the input, such as sketched on the FIG. 7, and assuming that the accelerated input drives an aoi21 (and/or/inverting) gate as represented on the figure, one can compute the delay of the accelerated input as:

$$D_{fast\_input} = delay(\text{and input of aoi21 gate})$$

$$= g + p = 2 + 2 = 4 \tag{17}$$

The delay of input belonging to the product of the accelerated input is:

$D_{same\_product\_slow\_input}$=delay (and input of aoi21 gate)+delay($n_n$-1 input nand gate)=4+(($n_n$-1)+2)/3+$n_n$-1=4/3 ($n_n$)+1 (18)

The delay of input belonging to other product is:

$D_{other\_product\_slow\_input}$=delay (or input of aoi gate)+delay ($n$-1 input nand gate)+delay ($n_i$input nand gate)=11/3+4/3*($n$-11+$n_i$)+4/3=5+4/3*($n$-1+$n_i$) (19)

If we further speed up inputs belonging to the same product, then we would not slow down the input of the other product.

Here to compute the delay of an accelerated input, one has thus to also take into account the number of accelerated product. One can tell that:

The delay of the ith accelerated input of the jth accelerated product is computed as:

$$D=(j-1)11/3+4+2+i*11/3=11/3*(j+i)+7/3 \quad (20)$$

1.4.2.3 DCF Contains Several Products, Without any Limitation on the Input Literals Here, the a quick estimation is based on Shannon factorization, implemented with the help of 2-input multiplexer, the Delay of which is given by:

$$D=2+2*2=6 \quad (21)$$

Assuming an input function, one can thus tell that the delay of the ith accelerated input is upper-bounded by:

$$D=i*6 \quad (22)$$

Also, here there is no formula to estimate the delay of the non-accelerated inputs, without really Shannon factorizing the function. At this level, one could store a table computing the average delay of a n-input function.

1.4.3 Flexible Model Delay Curve

Figure 8:
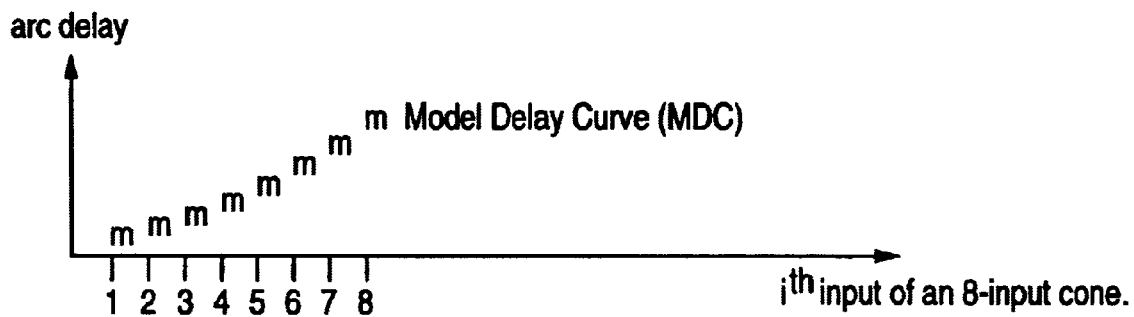
FIG. 8 is a graph of a flexible model delay curve of an 8-input cone.

A flexible Model Delay Curve (MDC) is a WLM dependent curve which relates the delay of the arcs of a totally un-balanced n-input cone/buffer tree to the n inputs of that cone/buffer tree. For instance, the FIG. 8 on sketches the flexible model delay curve of an 8-input cone. In this document, we represent points of the MDC as "m".

Flexible Delay Curve are automatically generated from the cone type or the buffer tree characteristics by using the previously presented formulas.

1.4.4 Realistic Delay Curve

Figure 9:
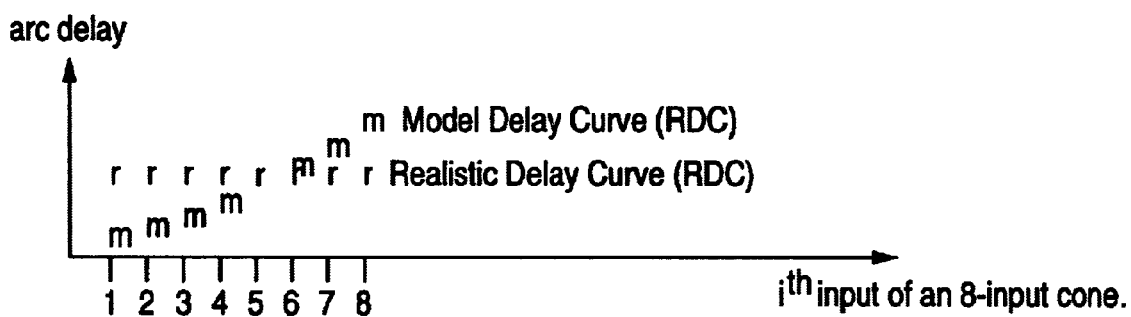
FIG. 9 is a graph of a Realistic Distributed Delay Curve (RDC) and a Model Delay Curve of the arcs of a cone/buffer tree.

A Realistic Distributed Delay Curve (RDC) is a WLM dependent curve which relates the distributed realistic delay of the arcs of a cone/buffer tree. At the very beginning, the RDC is a flat curve, resulting from the median of the MDC (see FIG. 9). Here, we represent points of the MDC as "r". The RDC is used by the report timing command for instance.

1.4.5 Budgeted Delay Curve

Figure 10:
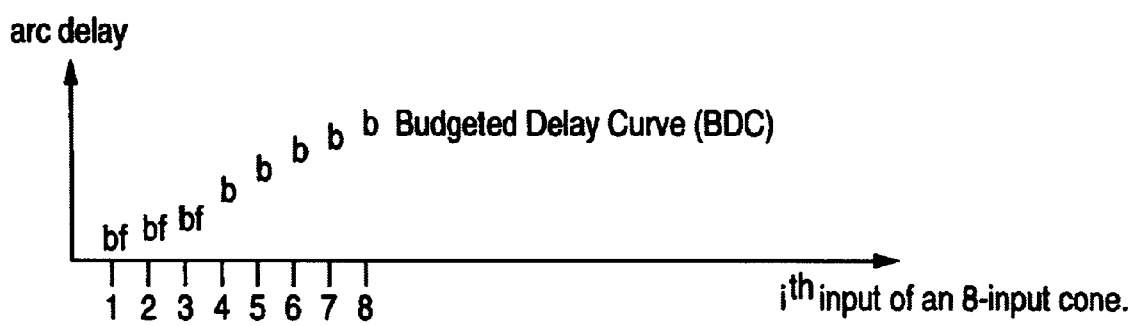
FIG. 10 is a graph of a Budgeted Delay Curve (BDC) of a cone/buffer tree.

A Budgeted Delay Curve (BDC) is a curve which relates the budgeted delays of the arcs of a budgeted cone buffer tree to the inputs of that cone/buffer tree (see FIG. 10). Points of the BDC are represented as plus "b".

As opposed to MDC, a BDC is WLM independent: a budgeted delay tells the delay of an arc, whatever wlm is used. As opposed to the RDC, a BDC may contain an unrealistic arc delay (delays which are not feasible according to the model)

Note that some of the points of the BDC do have an "f" attribute which stands for frozen. This means that the delays of the arc is totally budgeted, and not subject anymore to be re-budgeted. As we will see, during the budgeting, little by little, some of the cone arc will be totally budgeted. This will imply a lower bound on other cone arcs.

1.5 Parasitics Estimation

Parasitics Estimation is a task which is automatically triggered as soon as the designer does any one the following things: timing verification; budgeting; timing driven partitioning; timing driven block placement; timing driven global routing; and/or final budgeting.

Also, the parasitics are estimated according to the state in which IE currently is, including: estimated/inferred; partitioned; block placed; and/or globally routed.

Finally, the parasitics are valid as long as nothing is done which could yield them invalid (different state, for instance partitioned or block placed, or different characteristic within a state, for instance different block placement or different block partitioning).

In the following, we are presenting how parasitics are computed according to the IE state (state of the design into IE: estimated, partitioned, block placed, top level routing done, etc.).

1.5.1 Critical Block-Based Parasitic Estimation

This estimation should produce a placement independent wire load model to be used inside a block of critical size. Example methods to produce this wire load model include:

(1) derive the wire load model from a given library of wire load models;

(2) construct the wire load model from a technology independent wire length model table and some technology parameters such as the linear capacitance;

(3) construct the wire load model from on the fly design placement and parasitics extraction; and (4) construct the wire load model from Montecarlo-based technology independent wirelength estimation and some technology parameters.

Let's immediately mention that our preferred methodology to create a wire load model is the second one (b), but it should first be validated. Let's also mention that such a wire load model creation might be necessary for Physically Knowledgeable Synthesis (PKS), a Cadence tool which does netlist optimization and placement concurrently. These parasitics are valid as long as IE is this current state, that is, as long as IE does not enter in the partitioning mode. In the following sub-sections, we will present each of these methods.

1.5.1.1 Deriving WLM From a Library of WLMs

Given a TLF library of wire load models and a set of directives on how to use these wire load model with respect to some design size, we now derive a wire load model by interpolating WLM instances in the wire load model library to produce a wire load model corresponding to the critical block size (interpolation method).

However, the interpolation method is dependent upon the availability of such wire load, models within the library.

1.5.1.2 Constructing WLM from a Wire Length Model

A technology independent Wire Length Table (WLT) is created as a function of the design size, the library 2-input gate size and the fanout, where the design size takes into account the number of available metal layers. More specifically, the assumption is the existence of the following relationship:

$$WLT=F(designSize, gateSize, fanout) \quad (23)$$

Then, WLM can be created out of the WLT, the design size with aspect ratio, the design gate size and a technology file. Indeed, for each fanout value, WLT would give a Length (L). Then one can compute:

$$\text{Horizontal Length} = Lh = \text{aspectRatio} * L/2 \quad (24)$$

$$\text{Vertical Length} = Lv = 1/\text{aspectRatio} * L/2 \quad (25)$$

$$\text{Capacitance} = C = Ch*Lh + Cv*Lv \quad (26)$$

where Ch and Cv are respectively the linear horizontal and vertical capacitance as computed by Qplace (Cadence's industry leading placement technology) out of the technology file and the number of available metal layers (specified to Qplace with the help of available track percentage).

Therefore, after determining (23), which would be coded into a design tool, WLM is computed. WLM is computed from the WLT and the equations (2), (3) and (4).

1.5.1.3 Construct WLM from Quick Placement

WLM's constructed from Quick Placement are based on qplacing the design, extracting the parasitics and deriving a WLM out of these parasitics. The implementation would be as follows: when starting IE from scratch, once the library and the technology files are loaded, IE would generate a collection of designs of different sizes, would qplace them, would extract parasitics and derive wire load models for each design. These WLMs would be saved (e.g., in a database) in such a way that when starting IE from such a database, IE would not have to re-create these WLMs. Then, during a IE run, if new WLM are necessary, they can be derived by interpolating within the newly created database of WLMs.

1.5.1.4 Construct WLM From MonteCarlo-based Wire Length Model

In the Monte Carlo-based method, for each different fanout value, a set of fanout Value data coordinates in a 2-dimension space equal to the design size and, to extract a median Steiner tree length, is extracted in order to produce a WLT. A WLM can then be obtained by re-using the equations (2), (3) and (4) previously presented.

1.5.2 Partition-based Parasitics Estimation

Partition-based parasitics estimation is similar to the Critical Block-based Parasitics Estimation. One difference is the size of the blocks which are coming from the partitioning. Here, the parasitic estimator would generate one wire load model for each of the created physical block. The wire load model of a given block is to be used by each of the logical cell contained in that physical block. The estimator will also generate a top level wire load model corresponding to the complete design size. That wire load model is to be used for the top level physical nets. For instance, in the case of the FIG. 11, IE estimates, before partitioning, each of:

(1) a wireloadmodel a1_wlm, based on the size of cell a1 and to be used by cell a1; this wireloadmodel is sent to CTE;

(2) a wireloadmodel a2_wlm, based on the size of cell a2 and to be used by cell a2; this wireloadmodel is sent to CTE;

(3) a wireloadmodel a3_wlm, based on the size of cell a3 and to be used by cell a3; this wireloadmodel is sent to CTE;

(4) a wireloadmodel b_wlm, based on the size of cell b and to be used by cells b1, b2, b3 (and b); this wireloadmodel is sent to CTE; and (5) a wireloadmodel top_wlm, based on the size of cell top and to be used by net n1 (or node n1); this wireloadmodel is used to estimate the capacitance of the net n1. For that estimation, we consider a fanout of 3, as we can consider that it is the task of the logic synthesis to correctly buffer the part of that node inside the cell b. (This wireloadmodel is not sent to CTE; CTE does not know the physical hierarchy, it only knows the logical one). For this specific net (n1), CTE should use the given capacitance, and should not add anything related to the given wireloadmodels.

1.5.3 Block Placement-Based Parasitics Estimation

Figure 11:
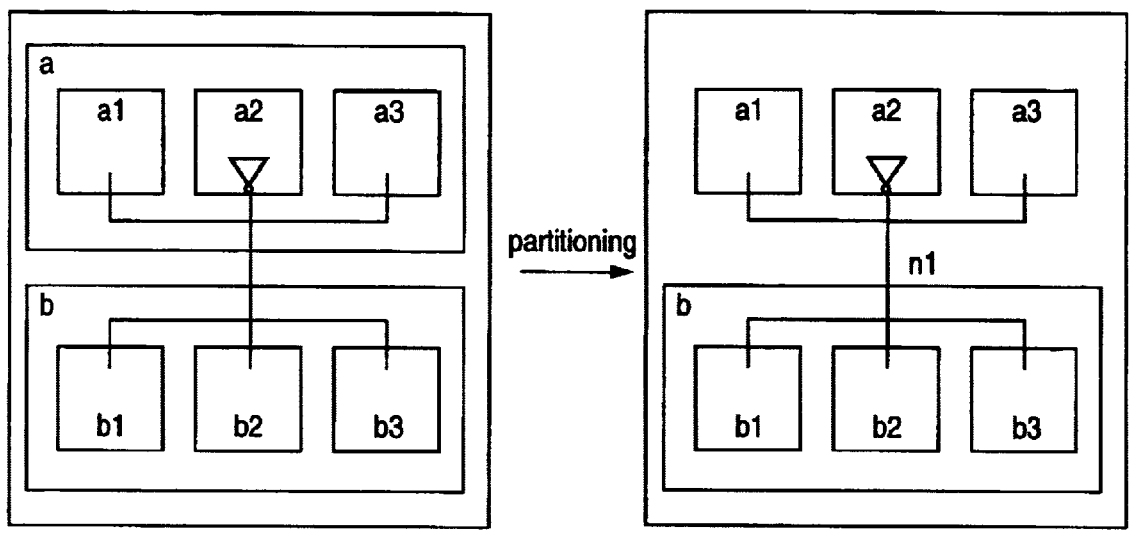
FIG. 11 is an illustration of an example partitioning of a design.
Figure 12:
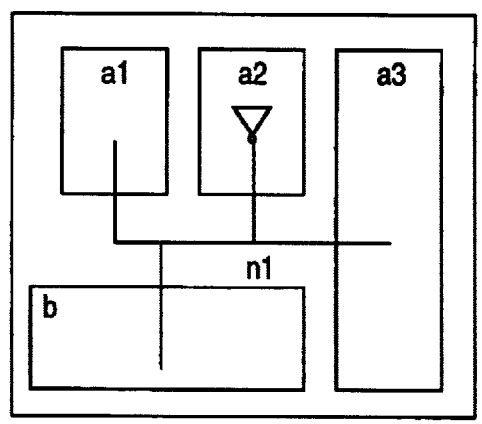
FIG. 12 is an illustration of an example block placement result.

FIG. 12 sketches the typical result of placement done on the partitioned design of the FIG. 11. For that block placement, IE estimates the following parasitics:

(1) a wireloadmodel a1_wlm, based on the size and the aspect ratio of cell a1 and to be used by cell a1; That wireloadmodel is sent to CTE;

(2) a wireloadmodel a2_wlm, based on the size and the aspect ratio of cell a2 and to be used by cell a2; That wireloadmodel is sent to CTE;

(3) a wireloadmodel a3_wlm, based on the size and the aspect ratio of cell a3 and to be used by cell a3; That wireloadmodel is sent to CTE;

(4) a wireloadmodel b_wlm, based on the size and the aspect ratio of cell b and to be used by cells b1, b2, b3 (and b); That wireloadmodel is sent to CTE; and (5) a block center to block center Steiner tree-based wiring capacitance for the net n1. That capacitance would be given to CTE, and CTE should consider that this capacitance is to be used for the whole net n1.

1.5.4 Timing Driven Global Routing+Parasitic Estimation

Timing driven global routing will back-annotate the timing optimization loop with the following pieces of data:

(1) the delay of buffered nets, on a source to sink base;

(2) the delay of the non-buffered nets, on a source to sink-base; and (3) the lumped capacitance to be seen by the source.

Figure 13:
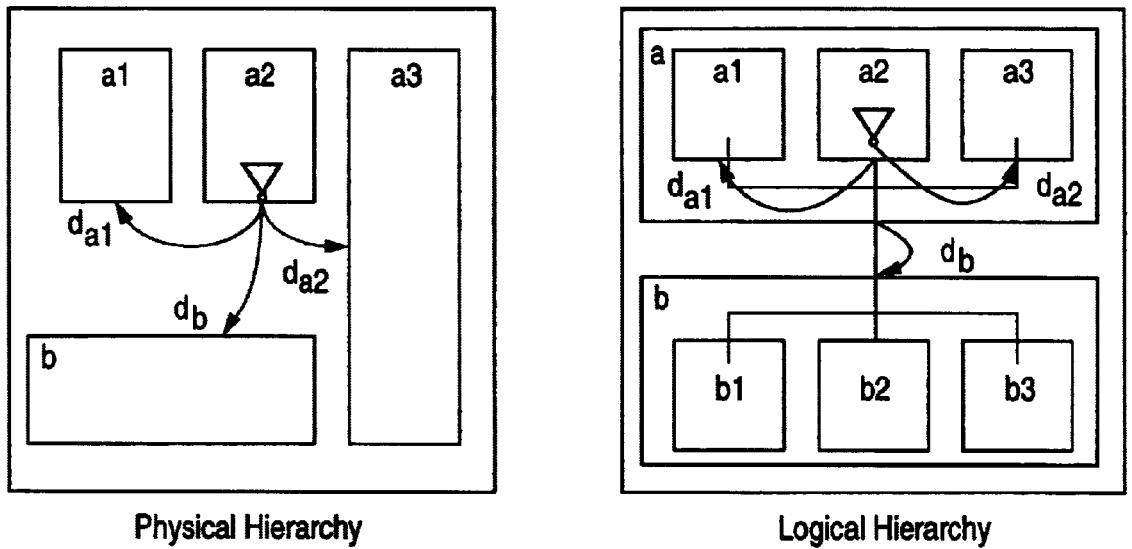
FIG. 13 is an illustration of an example back annotation.

The net delay, when different from zero, will be annotated to the flexible edge graph (based on the logical hierarchy) as sketched on the FIG. 13.

1.6 Gate Delay and Flexible Delay Estimation

The gate delays are estimated by the delay calculator, taking into account the estimated parasitics (for example, delay computing in a timing verifier). The flexible delays are quickly estimated by moving the RDC and the MDC. Remember that those curves are wlm dependent: the estimation task thus consists in moving these curves by a factor which is a function of the ratio of the new wlm on the old wlm (see discussion herein re: Estimating Flexible Gate Delay as a function of a new WLM).

1.7 Physical Budgeting

The goal of the physical budgeting is to quickly get:

(1) the feasibility of the design, using critical block parasitics; and (2) an estimation of gate complexity necessary to get the design working at the right frequency, using these parasitics;

Again, this estimation can be obtained by a classical synthesis run. Classical synthesis algorithms provide an accurate estimation of an architecture complexity, however, it costs too much CPU time to blindly run classical synthesis too to get these estimates. Put in other words, in order to estimate the complexity of a design subject to some timing constraints, as opposed to let a synthesis tool run for a long time to meet the timing constraints, our approach consists in smartly distributing the timing through all the design, and then to estimate the cost of an implementation more or less respecting that smart distribution. In order to smartly distribute the timing through the whole design, we take into account the interdependency between the different logical functions composing the design. We take into account that we can not have all the input-to-output path of a logical function as fast as possible: some path can be preferred if some other paths are slowed down. This can be done by modeling logical function by flexible timing model. In a nutshell, a flexible model quickly captures arc delay dependencies of a cone of logic.

In IE, the Budget command is a superior budgeting command in the sense that it generates realistic budgets, and provides estimates the resulting area of the budgeting.

The Budget command consists of four phases:

(1) estimate the parasitics, as explained in section (2) adapt the flexible model delay points with the current parasitic model.

(3) flexibility driven time budgeting; and (4) area/timing estimation of the budgeting;

In the following sections we are presenting the flexibility driven time budgeting and the area/timing estimation of the budgeting;

1.7.1 Flexibility driven Time Budgeting

The IE time budgeting process is based on the IMP (Iterative Minimax Pert) algorithm. "Bounds on Net Delays for VLSI Circuits", H. Youssef, IEEE Transaction on Circuits and Systems, Vol 39, No 11, November 92, for example, CTE provides the basic facilities to let an application run the IMP algorithm.

In the following parts, we first present some test cases explaining some of the pitfalls to avoid when determining the design. We then give some definitions and notations. Finally, we present how to use IMP in the context of IE. In the following, we assume that the reader is familiar with the IMP algorithm.

In the rest of this section (and document), we only mention cone, for the sake of simplicity. But we should keep in mind that the underlying netlist representation is clearly composed of cones and buffer tree (and sequential elements). Anything said for the cone is also valid for the buffer tree ※ the difference being the arc delay interdependency relations, as presented in the previous section.

1.7.1.1 Small Examples

Figure 15:
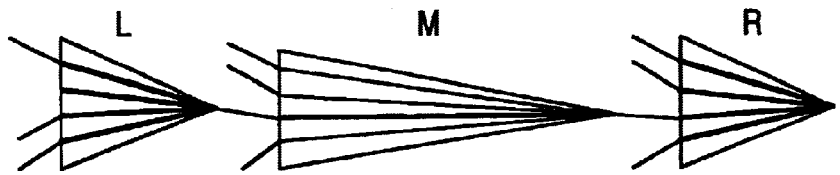
FIG. 15 is an illustration of a piece of a design composed of three interconnected cones of logic (timing cones)

FIG. 15 presents a piece of a design. That piece is composed of three interconnected cones of logic, respectively L (Left), M (Middle) and R (Right). The heavy lines within the cones represent the cone timing critical arcs. The light lines of the cones represent the cone timing non critical arcs. The size of the cone as well as the first row of the table below the cones represents the delay upper-bound of the cone arc. Let's assume that the minimum delay through one gate is "2". Let's assume that the time delay to be distributed is 10 ns. The second row of that table represents the result of a classical Upper Delay Based Budgeting (UDB Budgeting). On the one hand, that budgeting creates unfeasible timing budget on cones L and R. On the other hand, that budgeting under-constrain the critical arc of cone M. The third row, presents a more realistic Congestion Based Budgeting (CB Budgeting). That budgeting basically takes into account the cone arc delay interdependency relations presented in the previous sections.

Figure 16:
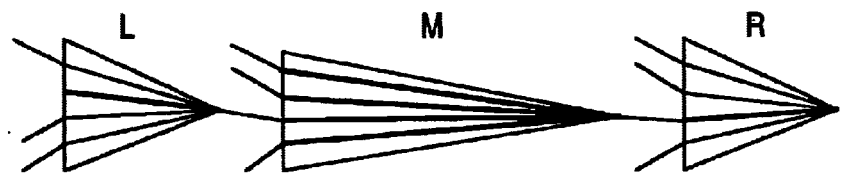
FIG. 16 is an illustration of cones of logic for a design, and statistical information for cone delay, UDB Budgeting, and CB budgeting.

FIG. 16 presents a piece of a design composed of three interconnected cones of logic, respectively L (Left), M (Middle) and R (Right). The heavy lines within the cones represent the cone timing critical arcs. The light lines the cones represent the cone timing non critical arcs. The size of the cone as well as the first row of the table below the cones represents the delay upper-bound of the cone arc. Let's assume that the minimum delay through one gate is "2". Let's assume that the time delay to be distributed is 12 ns. The second row of that table represents the result of a classical Upper Delay Based Budgeting (UD Budgeting). On the one hand, that budgeting creates unfeasible timing budget on cone M. On the other hand, that budgeting under-constrains the critical arc of cones L and R. The third row, presents a more realistic Congestion Based Budgeting (CB Budgeting). That budgeting basically takes into account the cone arc delay interdependency relations presented in the previous sections.

From the both previous experiment, we conclude that a relationship between a cone size and a cone arc budget only exists when all the cone arcs are critical. The time budgeting should thus be done according to the cone timing congestion.

1.7.1.2 Definitions and Notations

Let's call:

$\rho$, the weight of a given arc;

d, the current delay of a given arc;

$d_{amin}$ the absolute minimum delay of a given arc. That absolute minimum delay is a function of the cone type or the buffer tree containing the arc (see Section 3.4 on page 14).

$d_{rmin}$ the relative minimum delay of a given arc. That relative minimum delay is a function of the cone type or the buffer tree containing the arc, and of the current delay of the already budgeted arcs of the cone.

$P_\eta^{max}$, (P shortly), the maximal path weight among all the paths traversing a given arc. P is computed by propagating/back-propagating the arc weights in the design.

$U_\eta^{min}$, (U shortly), the minimum slack among all the paths traversing a given arc. U is computed by propagating (respectively back-propagating) the design arrival times (respectively the design required times).

Let's call the Relative Slack Distribution Formula the following equations, which updates the arc delay as a function of the arc current delay value (d), the arc weight ($\rho$), the slack of the worst path going through the arc (U), the maximal path weight among all the paths traversing a given arc (P), and the relative minimum delay of the arc:

$$d_{new} = \max(d + \rho * U/P, d_{rmin}) \tag{28}$$

Note that the standard IMP Slack Distribution Formula is simply:

$$d_{new} = d + \rho * U/P, d_{rmin} \tag{28bis}$$

Let's define a Balanced As Fast As Possible Cone, a cone which has been tiled in order to have all the arc delays as short as possible. Let's call $d_b$ the (balanced) delay of an arc of such a cone. Within such a cone, one has the following relation for each of the arc delay "i":

$$d_{b, i} >= d_{min, i} \tag{29}$$

We know that it is impossible to have all the cone arcs set to $d_{min}$. Also, from the arc delay interdependency relations derived from the Logical Effort theory presented in the previous section, we know how to slow down cone arcs when we speed up another cone arc. We say that a set of cone arcs are congested when the strict application of the Absolute Slack Distribution Formula on the set of cone arcs violates the delay interdependency relations. Also, let's define a Timing Congested Cone (shortly a Congested Cone), a cone which contains a set of congested arcs.

Note that Balanced As Fast As Possible Buffer Tree and Congested Buffer Tree are defined in an analogous way.

Figure 14:
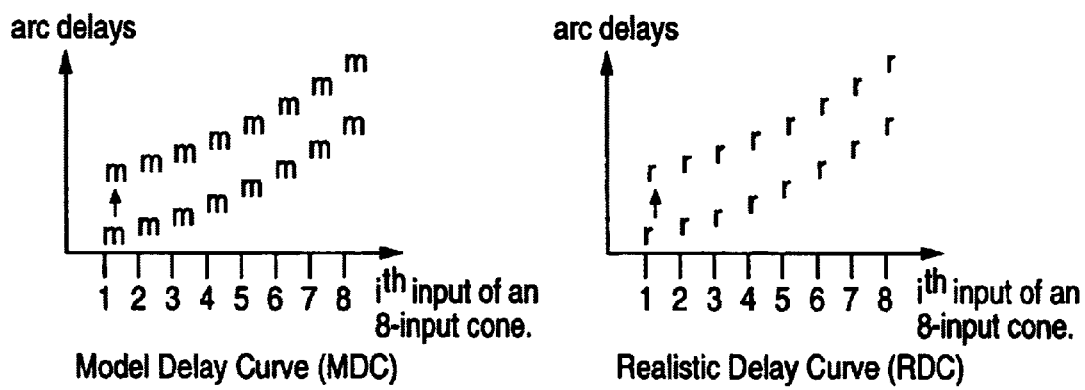
FIG. 14 is a set of graphs illustrating a Model Delay Curve, and a Realistic Delay curve for estimating Flexible Gate Delay.

The budgeting process presented in the next section is incremental. At the very beginning, assuming that none of the design is frozen (that is that the complete design has been estimated from the RTL description), all the design will be totally flexible. Then while the process is running, little by little, pieces of cone arc will become frozen while other piece(s) will still be subject to flexibility. For instance, at the beginning of the budgeting process, all the arcs of the cone M of FIG. 14 will get a zero delay. While the process is running, the critical arc(s) of that cone will be seen as a set of congested arcs, and will get a pretty small distributed delay. As a matter of fact, that decision will force the non-critical arcs to get some of their delay defined. We thus define the flexible part of an arc, the part which is still subject to be modified. We also define the frozen part of an arc, the part which is already frozen. At the beginning, the frozen part of any arc is null (except if any part of the design structural piece is user-specified as frozen, thus not subject to any slack distribution). When the flexible part of an arc is null, the arc distributed delay is frozen.

1.7.1.3 Flexibility Driven Physical Budgeting

Figure 17:
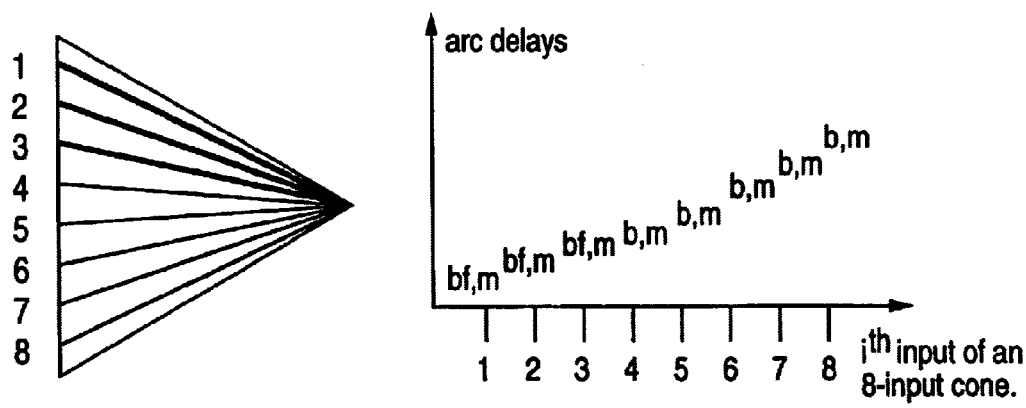
FIG. 17 is an illustration of a logic cone and Budgeted Delay Curve showing results of a congestion driven positive slack distribution.

IE Physical Budgeting process, based on the IMP algorithm, is presented in FIG. 20. That process is composed of three different phases:

(Phase 1) A Congestion Driven Positive Slack Distribution. That phase is composed of the steps 1 to 11 (see FIG. 20). The main goal of this phase is to distribute the positive slack on the arc as a function of the cone timing congestion, respecting the arc delay interdependencies (formula 28). That phase starts by setting all the cone arc delays to zero, then little by little distributes the slack on the congested arcs only. During this first phase, the non-congested arcs do not get any slack. The Budgeted Delay Curve on FIG. 17 sketches the typical results of this congestion driven positive slack distribution:

(a) the three first inputs were congested, and thus got a budgeted delay "bf" equal to the model delay "m"; furthermore, that budgeted delay got the "f" attribute which means that these delays are not subject to get anymore slack during this first phase. The weight p of these arcs is thus reset to zero.

(b) the last five inputs were not congested; they thus get a delay "b" equal to the model delay "m", which reflects the fact that these delays could not be smaller than the model delay. However, these arcs are still subject to get slack, the weights of these arcs is thus untouched.

Note that respecting the arc delay interdependencies might create a negative slack (negative U) during the while ioop (step 5). However there is no risk of setting a negative arc delay because of the "max" nature of the relative slack distribution formula. Note that at the end of this first phase the positive slack is NOT totally distributed. The main reason for that is that during the first phase, we only distribute slack on sets of congested arcs. As a matter of fact, some arcs will still have some flexibility. From a quick look at the FIG. 17, one can tell that the complete slack has not been distributed on the nodes driving the inputs 5 to 8, as they do not have the frozen flag. That problem is fixed during the second phase.

In addition, the slack U on some nodes within the design might be negative; The main reason for that negative slack is the relative slack distribution formula. That problem is fixed by the third phase.

Figure 18:
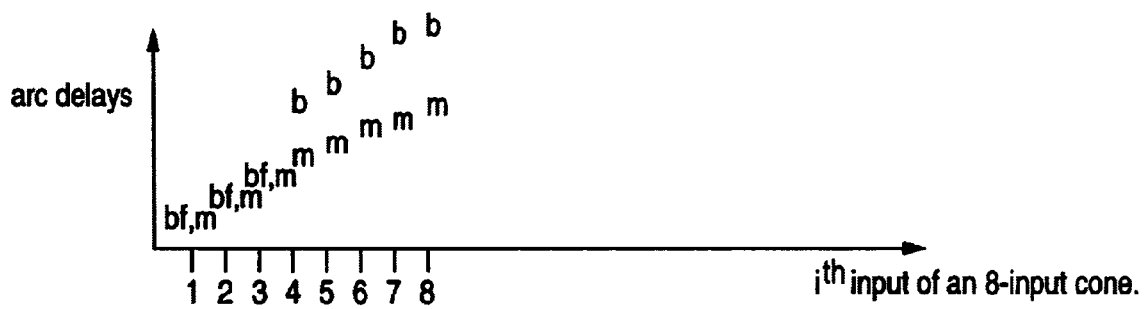
FIG. 18 is a graph that illustrates results of a regular positive slack distribution.
Figure 19:
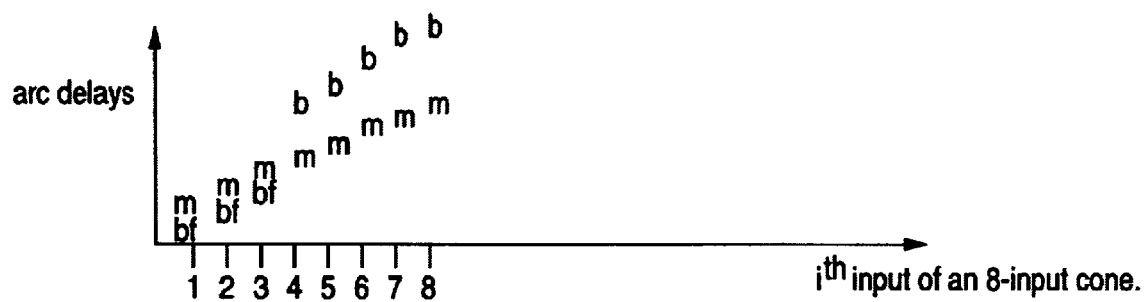
FIG. 19 is a graph that illustrates results of a delay driven negative slack reclamation.

(Phase 2) Regular Positive Slack Distribution Phase. This phase is composed of the step 11. As explained above, the first phase is only distributing the positive slack on the set of congested arcs. It is thus very likely (and desired) that at the end of the first phase, there are still some arcs which are still either totally flexible or partially flexible. The goal of this third phase is to distribute some % of remaining positive slack respecting the arc delay interdependencies. In this way, IE books some positive slack for the partitioning, block placement and inter block global routing. FIG. 18 sketches the results of the regular positive slack distribution on the example of FIG. 17: the last five inputs got a budgeted delay "b" bigger than the model delay "m", which reflects the fact these arcs do not belong to timing critical paths. And, (Phase 3) Arc Delay Driven Negative Slack Reclamation Phase. This phase is composed of the steps 12 to 19 (see FIG. 20). FIG. 19 sketches the results of such an area reclamation: the three first inputs now do have a budgeted delay "b" smaller than the modeled predicted smallest possible delay "m".

The first phase might produce a negative slack for any of the following reasons, the user specified system level constraints are too tight;

the greediness aspect of the distribution of the first phase;

the cone arc delay estimation functions are conservative; and/or the structure of the boolean network out of which are extracted the cones and the buffer trees.

Here, we first calibrate the budgeting process, in order to find out its accuracy.

Preferably, a report indicates the negative slack produced by the first step. If that negative slack is greater than a certain threshold percentage, this means that it is very likely that the timing constraints are too tight. In the opposite situation, the three remaining reasons can be fixed by an Arc Delay Driven Negative Slack Reclamation. That is by distributing the negative slack, but this time as a function of the arc delay. We can put it in other words as follows: in a first phase, we tried to distribute the slack in order to respect the cone arc delay interdependencies. At the end of the first phase, the cone arc delays are thus correctly reflecting the relative length that these arcs should have. Arc Delay Driven Negative Slack Reclamation keeps these relative lengths. At the end of that third phase, any arc whose delay as allocated by phase 1 had to be decreased by the current phase 2 will store two delay values:

(First delay value) a budgeted delay value which is the delay as constrained by this phase 2. That constrained delay value will be used to generate synthesis script.

(Second Delay Value) a realistic delay value which is the delay estimated out of phases 1 and 2; That realistic value will be stored, because in conjunction with the budgeted delay value, it will help to keep track of the cones which are congested, and thus are likely to be critical.

In IE, after budgeting, each budgeted cell has a budgeted attribute automatically set by the budget command. That attribute will be used for incremental budgeting, when reloading new RTL cells. The budgeted attribute can be cleared with the help of the "clear budget" command.

In the rest of this section, we review one by one the main steps of that process.

1.7.1.3.1 Step 1: Setting Budgeted Arc Delays to Zero

The IMP algorithm is designed to distribute slack on nets to drive placement tool. The IMP algorithm starts by setting gate delay to real gate delay, and wire delay to zero. Then IMP distributes the positive slack to the wire delay.

To start our process, we consider that none of the slack is distributed. We thus set all the cone and buffer tree arc delay to zero. Obviously, any frozen piece of the design (that is any piece loaded as structural netlist, not subject to any optimization) presented as set of interconnected gates to the budgeter would get real gate delay (as opposed to null gate delay).

1.7.1.3.2 Step 2: Setting Arc Weights as a Function of the Fastest Implementation of Their Flexible Part The main idea of the original IMP algorithm was to distribute slack on the path among constituent nets according to relative weight of their physical and electrical characteristics, e.g. proportional to the number of fanout, driving strength.

In the present invention, slack is distributed according to relative weight of the fastest implementation of the flexible part of the arc: if an arc of a 1-cube DCF cone is not faster than n times the delay of an arc of a buffer tree, then the relative weight of such an arc should be n times bigger than the relative weight of a buffer tree arc.

1.7.1.3.3 Steps 3, 8, 15, 18: Propagating Timing

The timing propagation is an arrival time propagation, required time back-propagation, using the arc budgeted delays. This is assumed to be a CTE service. At the end of that propagation, a minimum slack U can be extracted on an arc base.

1.7.1.3.4 Step 4, 9, 14: Propagating Arc Weights

The arc weight propagation is a standard propagation (standard propagation is a timing information propagation done by timing verifier algorithm). This is assumed to be a CTE service. At the end of that propagation, it is assumed that maximum weight P can be extracted on an arc base.

1.7.1.3.5 Step 5: Detection of Congested Cones

The detection of the congested cone simply consists in iterating through all the cones and the buffer tree and in detecting the congested ones. By definition, a congested cone contains a set of congested arcs. One method to detect a set of congested arcs, to compare the arc distributed slack of the cone arc ($\rho*U/P$) together with set of feasible implementations coming out of the cone arc delay interdependency relationships (the mdc curve). One method to do this comparison is to:

(1) represent within a table the fastest to the slowest arc delay of a totally unbalanced implementation of the cone (the mdc of the cone). This comes immediately out of the cone flexible model and the initial library characterization;

(2) sort the arc distributed slack from the fastest to the slowest; and (3) iterate from the slowest arc delay to the fastest one, stop the iteration as soon as a distributed slack is smaller than a mdc arc delay; that arc plus all the remaining arcs are forming a set of congested arcs.

Figure 21:
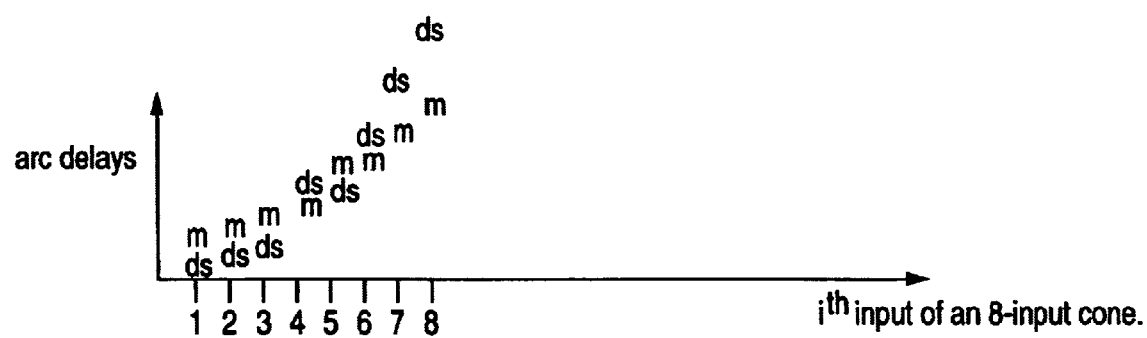
FIG. 21 is a graph that illustrates the detection of congested cones.

The method is illustrated in FIG. 21, where the model delay curve (mdc) of an 8-input cone is represented by "m", and the distributed slacks are represented by "ds". Starting from the slowest input, namely the 8th input, the iteration would stop at the 5th input, where the distributed slack is smaller than the model estimated gate delay. Inputs 1 to 5 would thus be considered as congested.

1.7.1.3.6 Step 6: Distributing Slack in Congested Cones

Figure 23:
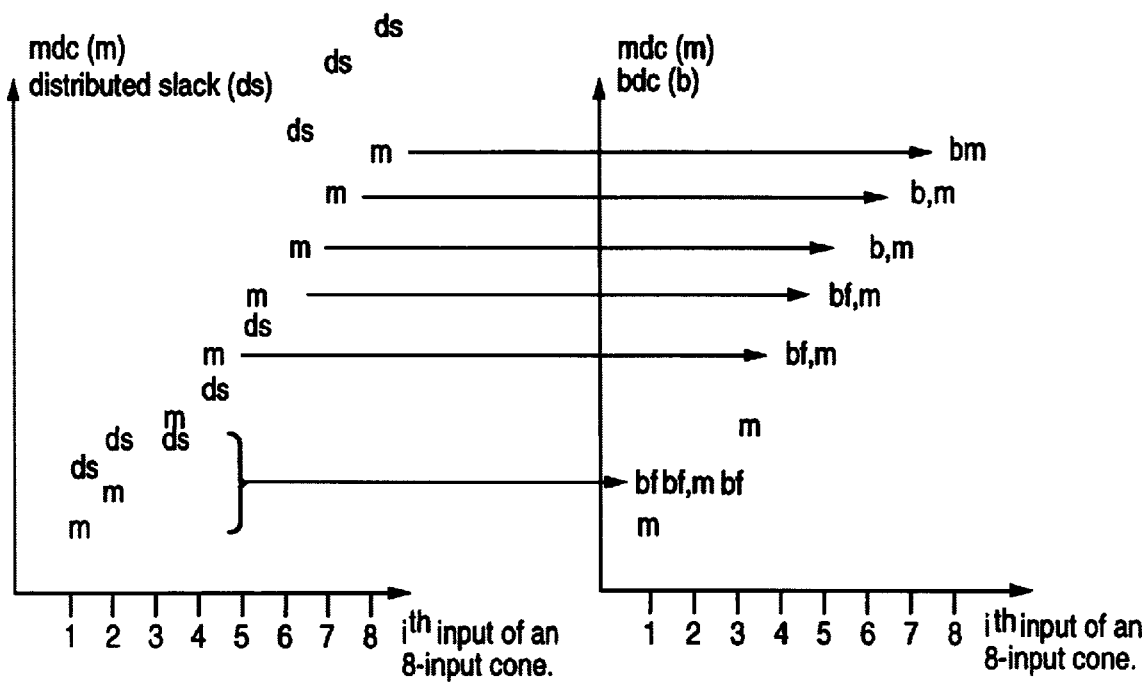
FIG. 23 is a chart illustrating distribution of realistic budgeted slack within a congested cone.
Figure 25:
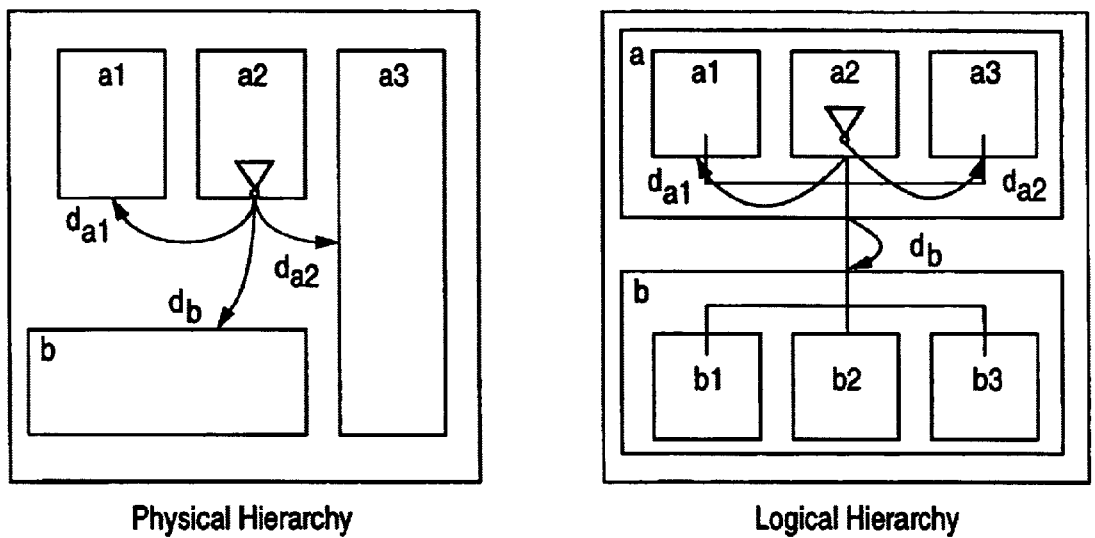
FIG. 25 is an illustration of back annotations of a top level delay to a logical hierarchy.

A process to distribute the slack in a congested cone is sketched on the FIG. 22 and illustrated on the FIG. 23.

On that later figure, the set of congested arcs is composed of the 5 faster arcs. The first three model delay curves (mdcs)arcs are set to the median of the three first mdc. The fourth arc delay is set to the 4th mdc and the 5th arc delay is set to the 5th mdc. The same is done for the three remaining non congested arcs. But the key difference is that these three remaining arcs are still subject to some further slack distribution, that is, they still have some flexibility, while the first 5 arc do not have anymore any flexibility, they are totally frozen.

1.7.1.3.7 Step 7: Updating Weights in Congested Cones

Any congested arc detected by the previously presented methods get a zero weight, while any un-congested arc keeps its weight untouched. In the case of the example of the FIG. 23, the weights of the first five arcs are thus set to zero, while the weights of the remaining are kept untouched.

Note that the weight update is really implemented within the slack distribution function presented in the previous section.

1.7.1.3.8 Step 11: Distribute Some % of the Positive Slack to Flexible Arcs

This done by using the following formula:

$$d_{new}=\max(d+\rho*\tau\%*U/P, d_{rmin}) \qquad (30)$$

This will book some slack for the top level interconnect. Note that:

(1) if $\tau==0$, then the logic might be over-optimized; the resulting estimated area will be too big as compared to the real final area.

(2) if $\tau==100$, then no propagation delay is booked for the top level interconnects.

Thus, $\tau$ is a function of the remaining slack. Also, as we do not want to completely distribute the remaining positive slack, therefore, one iteration of the IMP algorithm is good. As the U and P are still available from the previous steps, we just have to distribute the time. In order to define $\tau$, the user will initially specify some parameter giving the average worst delay on the top level nets (max top_level_path_length). Then $\tau$ is dynamically computed as:

$$\tau=\max((U-\max\_top\_level\_path\_length),0)/U \qquad (31)$$

Among all the design timing paths:

(1) some of them do not contain any top level net;

(2) some of them contain one top level net;

(3) some of them contain several top level nets.

Defining path_length the length of a timing path. Let's define as top_level_path_length the portion of the length of a timing path spent on the top level nets belonging to that path (If the path does not contain any top level net, top_level_path_length of that path is null; if the path contains several top level nets, top_level_path_length is the sum of the delays of the different top level nets belonging to that path). Let's define as worst_top_level_path_length the worst top_level_path_length of any timing path in the design. The user-specified max_top level_path_length constrains the worst_top_level_path_length of the design (the value of max_top_level_path_length will be set by the user according to the user's experience based on previous similar designs). In "Planning for Performance", Otten and Brayton, DAC 98, pp 122–127, half the clock period is suggested.

1.7.1.3.9 Step 12: Copying bdc to rdc

The goal of the following steps will be to compress the budgeted arc delays estimated by the previous steps. The goal of that compaction is to reach a zero slack in order to correctly generate synthesis scripts. However, that compaction will produce difficult to reach timing constraints. We thus want to keep track of the initial budgeted estimated arc delay, in such a way that after the negative slack reclamation, it will be possible to report the timing congestion to the user. This will tell to the user where cones containing compressed arcs are located. By definition, a compressed arc is an arc such that its budgeted delay is smaller than the model predicted delay (BDC<MDC) The order of magnitude of the arc compression will help the designer to find out whether the synthesis tool nevertheless has a good chance to succeed or if it is necessary to modify the RTL code.

1.7.1.3.10 Step 13: Set Arc Weight as a Function of the Frozen Arc Delay

This step is immediate. Arc Weight=frozen arc delay.

1.7.1.3.11 Step 16: Detecting Negative Slack

The detection of the negative slack is immediate as soon as a full arrival time propagation/required time back-propagation has been done.

1.7.1.3.12 Step 17: Distribute Negative Slack

The negative slack distribution is done with the classical IMP Slack Distribution:

$$d_{new} = d + \rho * U/P \text{ if } U < 0 \tag{32}$$

That negative slack distribution compresses the delay of the arcs belonging to a negative slack path.

1.7.2 Area Estimation of the Budgeting

Once each of the cone/buffer tree are budgeted, the resulting area is evaluated. Available methods include:

(1) Method 1: using a technology mapper to map one by one all the cones/buffer tree, forcing them to respect the budgeted arcs delays; On an implementation point of view, this is immediate, using epsilon technology mapper.

(2) Method 2: scale the initial area obtained by the IE Estimator (running the Boolean Optimization, for example) with some factors deduced from a comparison between budgeted arc delays d and the arc minimum delay drmin The advantages of the first method are:

(1) good accuracy of the area estimation;

(2) in case the compressed delay are different from the initially budgeted delay, IE has a chance to find out if these compressed delays are somehow realistic or not.

The main disadvantages of the first method are CPU and memory usage.

The advantages and drawbacks of the second method are the opposite of the advantages and drawbacks of the first method. The key for making a decision is thus to get an idea of the relative estimation error done by using the second method. As the initial mapping is done by the estimation, which is controlled by some fanin and some fanout limit, error generated by the second method will be around 10 to 15%. We thus decide right now to use second method (it will still be possible to use method 1 later on). Thus, the present invention adapts the estimated area with some factor based on the budgeting. It is preferred that the user optimize/synthesize the blocks on which strong timing congestions are determined.

1.8 Timing Verification

In order to let the user check (timing paths change with different placements of the blocks and gates)the timing after the budgeting, we propose three different mechanisms.

The user will have access to a BuildTime "report_timing" command. That command will report the top n worst path end point (n is user-specified, and may be defaulted to 10). The user will then be able to select one of this path end point, to get the full trace of the path ending on that path end point. If the user is in graphical mode, and if the floorplan is already done, that path will be cross-probed in IE floorplan. (The look and feel will he the same as the one existing in the current PDP/Pearl link). That timing analysis will be based on the realistic timing arcs. That is, that timing analysis will report timing violations if there are any estimated timing violations. Another reason why report_timing might report negative slack is when the design contains a lot of fixed structural netlists, not subject to any budgeting. A nice enhancement for the report_timing command would be to add some attribute on the reported path segments to tell the user which parts of the path are "fixed".

In IE, the designer will have access to a "report_timing_congestion" command. In Shell mode, that command will:

(1) report the ratio of congested cone/buffer trees in all the logical cells; the congested cones are automatically found by comparing their bdc with their rdc.

(2) if the partitioning is done, it will report the ratio of congested cone/buffer trees in all the physical blocks.

In Graphical mode, that command will:

(1) report the ratio of congested cone/buffer trees in all the logical cells in the logical browser;

(2) if the partitioning is done, it will report the ratio of congested cone/buffer trees in all the physical blocks, in the physical browser;

(3) if the block placement is done, will report timing congestion in the floorplan pane, by for instance coloring in red the blocks which are heavily timing congested.

Finally, in IE, the designer will have access to a "report_budget" command. That command is equivalent to the report_timing command, except that it uses the budgeted delays as opposed to using the realistic delays. The report_budget command reports negative slack in case the fixed logic exceeds the value of the path constraint.

1.9 Timing Driven Partitioning

In this section, we present the service and/or the information that can be provided by the Timing Optimization Loop to the Physical Partitioning.

The timing optimization loop provides the following services to the physical Partitioning:

(1) the cell congested cone/buffer tree ratio;

(2) the worst slack U on any hierarchical net.

The goal of the physical Partitioning is to avoid to create a physical net on a negative slack logical net.

In order to give these services to the physical Partitioning, three main functions are provided:

(1) the ability to run a timing propagation;

(2) the query of slack on a net base;

(3) the query of congestion ratio on a logical cell base.

1.10 Timing Driven Block Placement

In this section, we present the service and/or the information that can be provided by Timing Optimization Loop to the Block Placer.

The timing optimization loop provides a service to the block placer that identifies the slack U on any hierarchical net.

The goal of the block placer is to keep negative slack physical net as small as possible. This is specified to the block placer by the net weights (net weights are constraints on the placer). By default, the netweights are set to 1. If the user has set the net weights to n (where n>1), this means that the wire length of that net will be seen as n times longer by the block placer (the block placer attempts to minimize the total wire length of the top level net).

In order to give these services to the physical practitioner, the following processes are provided:

(1) the ability to run a wire budgeting; One embodiment of the wire budgeting method (process) is sketched on the FIG. 24. The method allows for nodes having negative slack, which is anyway not distributed again. As a matter of fact, top level nets belonging to a negative slack timing path will NOT get any distributed timing slack. (If we want to make a distinction between a node which got a 0.00 1 ns distributed slack, and a node which did not get any slack because it was belonging to a negative slack path, we also have access to the on a node-based, that Umjn being negative on a negative slack path); and (2) the query of a budgeted slack on a net base.

1.11 Timing Driven Global Routing+Parasitic Estimation

The goal of this section is to present:

(1) services to be implemented by the timing optimization loop for timing driven global routing, mainly consisting of a Wire Budgeting process as presented in 1.7.1.3. The global router will get weight computed from a top level net delay budget. Together with the user-specified metal layer, this will force CCT global router (a Cadence design tool) to run in a timing driven mode. As soon as CCT has completed global routing, the top level buffer insertion will extract the parasitics out of the global routes and will buffer the nodes according to the delay budgets; and (2) services to be implemented by the global routing for continuing the timing optimization loop. These services consists of back-annotating the timing optimization loop with the following pieces of data:
the delay of buffered nets, on a source to sink base;
the delay of the non-buffered nets, on a source to sink-base;
the lumped capacitance to be seen by the source.

The net delay, when different from zero, will be annotated to the flexible edge graph (based on the logical hierarchy) (for example, as sketched in FIG. 22).

1.12 Time Budgeting

The post global routing delays of some nodes might be slower than the budgeted delays. Also, the Physical budgeting might have booked to much delay for some other nodes. Once the global routing has been done, it is thus necessary to run both a regular positive slack distribution and a negative slack reclamation. This is the goal of the incremental budgeting, and, in IE, is invoked by the budget_time command. FIG. 26 sketches an embodiment of the Time Budgeting process:

Step 0: the arc delays are adapted with the new parasitics estimated during the previous step;

Step 1: the budgeted delays are reset to the realistic delays: the goal of the Final Budgeting is to recompute the budgeted delays;

Step 2: The partitioning, block placement, global routing might have created some positive slack. The max_top_level_path_length variable is ignored, as there is no more point to book any delay for the top level nets. In that case, all the positive slack would thus be allocated to the logic.

Steps 3 to 9: same as the Negative Slack Reclamation Phase of the budgeting process (see FIG. 20, for example).

1.13 Synthesis Script Generation

The synthesis script generation is done using the "write synthesis flow" command. That command takes design logical hierarchical instances as arguments. For each of these hierarchical instances, it generates a synthesis script containing all the relevant commands which are necessary to synthesize/optimize that instance according to IE floorplan. One of these commands tells the synthesis tool to open a wlm file, while another of these commands tells the synthesis tool to open a constraint file. In this document, we are focussing on the constraint file generation and on the wire load model file generation.

1.13.1 Wire Load Model File Generation

The wire load model file generation consists of dumping the IE created wire load models into a TLF file.

In the case of the physical hierarchy of the FIG. 27, IE would creates two wire load models:

(1) wlm_block1, to be used within the block block1; and (2) wlm_block2 to be used within the block block2.

1.13.2 Ambit Timing Constraint (ATC) File Generation

The constraint file generation consists in generating an Ambit Timing Constraint file containing the following information:

(1) budgeted timing constraints;

(2) specification of the wire load models to be used, on a cell basis;

(3) environment information.

1.13.2.1 Generating Budgeted Timing Constraints

The logical cell timing constraints are generated from the budgeted arc delay values. These timing constraints are composed of:

(1) the waveform of the clock of the design;

(2) declarations of the clock;

(3) clock related input/output delays; and (4) multi-cycles;

1.13.2.2 Specification of the WireLoadModel

For each of the logical hierarchical instance belonging to the selected instance for which we are generating a constraint file, one should get a statement specifying which wlm is to be used. Assuming the logical and physical hierarchy displayed on the FIG. 27, the constraint file for instance A should contain:

(1) a directive to use wlm_block1 for instance a1; and (2) a directive to use wlm_block2 for instance b1.

1.13.2.3 Environment Information

The environment information is composed of:

(1) the type of gate driving an input terminal;

(2) the load on each output terminal;

(3) the fanout of an output terminal;

(4) the max_fanout of an input terminal;

(5) the max_load on an input terminal.

(6) the number of external inst_terminals driving a node.

In the following section, we review how these different values are computed.

1.13.2.3.1 The Type of Gate Driving an Input Terminal

The synthesis directive specifying the type of gate driving an input terminal is user-controlled with the help of the "set budget_output_driver<cellName>" command. If set by the user, IE will use cellName for specifying the type of cell driving input terminal. If not set by the user, then two cases may arise:

(1) the input terminal is driven by a IE-buffered top level physical net; in this case, IE will specify the buffer buffering that net as the input terminal driver; and (2) the input terminal is not driven by a IE-buffered top level physical net; in this case, IE will specify the library's fastest two-input nand gate as the input terminal driver.

1.13.2.3.2 The Load on an Output Terminal

The computation of the load of an output terminal is dependent upon the value of a global budget$_{13}$ fanout value specified by the user with the help of the "set budget_ fanout<value>" command. The computation of the load of an output terminal load also depends upon the library average input terminal capacitance value, which can be set via the "set budget_input_capacitance<value>" command.

The computation of the budgeted load of an output terminal depends upon the topology of the output terminal:

(1) The output terminal does not drive a top level physical net (see output terminal o1 of cell a1 in FIG. 28); in other words, the node connected to that terminal is totally enclosed within the physical block containing the current budgeted instance. In this case, the load is computed with the help of the following formula:

$$load=budget\_fanout*budget\_input\_capacitance+wireloadmodel-(budget_{13} \text{ fanout}) \quad (33)$$

In addition, even if the output terminal is driving 15 other hierarchical cells as opposed to three other hierarchical cells as in FIG. 28, IE would use the budget_fanout limit, that is IE assumes that the buffers would be correctly inserted inside block1. Note that under these circumstances, one would advise the user to budget block1, not the cell a1; this is possible if block1 corresponds to a logical cell in the design. (IE also provides an option to update the logical hierarchy in order to have it match the physical hierarchy), or (2) the output terminal only drives a buffered top level physical net (see output terminal o1 of instance a2 in FIG. 29) In this case, the output load is computed as the sum of the wire capacitance between the output terminal and the buffer plus the input capacitance of the buffer.

(3) the output terminal only drives a non buffered top level net (see FIG. 30) In this case, if the top level net is not resistive, IE time budgeter would not compute an rc delay for that node, and would estimate the load as:

$$load=wirecap(\text{top level net})+\text{sum frozen driven block input capacitance}+(\text{numberofunfrozendrivenblock*budget\_input\_capacitance}) \quad (34)$$

where the input capacitance of a frozen block may be read in the TLF model of the frozen block, or computed if the frozen block is given as a netlist (using a wire load model and the input capacitance of the load pin inside the block). For instance, in the case of the design of FIG. 30, output terminal o1 of cell a2 is driving a load composed of:

(1) the wire cap (capacitance) of the top level part of the physical net (the heavy line);
(2) the total cap inside block4. That cap is composed of three load cap and a wire cap corresponding to a fanout of 3;
(3) the input cap of block3 given as a TLF model; and
(4) as block2 is flexible, we can consider that a during the synthesist optimization, the input fanout will be reduced to 1. So, for block2, the load correspond to budget_input_capacitance+a wire cap corresponding to a fanout of 1.

If the top level net is resistive, IE time budgeter would have estimated an rcdelay for that node, and IE load budgeter would specify a load corresponding to the $C_{eff}$. In this case, the RC delay of the top level net has already been taken into account during time budgeting.

(5) or the output terminal drives a mixed of buffered/unbuffered top level net and some other gate inside the block enclosing that terminal, in which case, IE would compute the load by using the different formula previously presented.

1.13.2.3.3 Fanout on Output Terminal

Computation of a budgeted fanout on an output terminal depends upon the topology of the output terminal.

In one case, the output terminal does not drive a top level physical net (see output terminal o1 of cell a1 in FIG. 28); in other words, the node connected to that terminal is totally enclosed within the physical block containing the current budgeted instance. The fanout is computed with the help of the following formula:

$$fanout=budget\_fanout \quad (35)$$

In this case, even if the output terminal is driving 15 other hierarchical cells as opposed to three other hierarchical cells as in FIG. 28, IE uses the budget_fanout limit, that is IE assumes that the buffers would be correctly inserted inside block1. Note that under these circumstances, one would advise the user to budget block1, not the cell a1; this is possible if block1 corresponds to a logical cell in the design. (IE also provides an option to update the logical hierarchy in order to have it match the physical hierarchy).

In the case where the output terminal only drives a buffered top level physical net (see output terminal o1 of instance a2 in FIG. 29), the output fanout is the fanout of the input terminal of the buffer (defaulted to 1).

And, in the case where the output terminal only drives a non buffered top level net (see FIG. 30 on page 54) In that case, IE time budgeter estimates the fanout as:

$$fanout=\text{sum frozen driven block input fanout}+(\text{number of unfrozen driven block*budget\_fanout}) \quad (36)$$

where the input fanout of a frozen block is either read in the TLF model of the frozen block, or computed if the frozen block is given as a netlist. For instance, in the case of the design of FIG. 30, output terminal o1 of cell a2 is driving a fanout composed of:

(1) the total fanout inside block4.
(2) the input fanout of block3 given as a TLF model; and
(3) as block2 is flexible, we can consider that a during the synthesis/optimization, the input fanout will be reduced to 1.

2. Shell (TCL) Interface 2.1 Initializing the Timing

The timing is initialize with the help of the following command:

initialize_timing<[ATC]file>

Note that the initialize_timing is incremental: RTL cells which have already been budgeted and which still has its budgeted attribute (automatically set by the budget command) will keeps its budgeted value.

2.2 Report Timing Violations

The Timing Violations can be reported with the help of the following BuildTime command (refer to BuiltTime users guide):

report_timing

Note that the report_timing command flags with an "F" any fixed delay and flag with a "B" any budgeted delay in any reported path.

The report_timing command is enabled as soon as the user budgeted the design with the help of the initialize_timing command.

The report_timing first automatically extracts the parasitics if those are not yet extracted, or are no longer valid.

2.3 Physical Budgeting

The budgeting is done with the following command:

budget_physical

The budget_physical command distributes the timing slack between the flexible combinational blocks while booking some slack for the top level interconnect delays. The portion of slack booked for the top level interconnect is user-controlled with the help of the set_max_top_level_path_length command.

At the end, the budget_physical command marks all the budgeted cell with the budgeted attribute. (That attribute can be cleared by the user with the help of the "clear budget" command.

Note that the budget_physical command is incremental in the sense that it does not re-budget any cell which still has a valid budgeted attribute.

Note also that as the budget_physical command analyzes the area impact of the budgeting, the gate complexity estimation of the cell is modified by the budgeting command. In case the budget_physical command is done after the block placement, the user would see that the block area is modified by the budget_physical command.

The budgeting is performed prior to running a timing driven partitioning, a timing driven block placement and a timing driven top level global routing.

The budget_physical command is enabled as soon as the designer uses the initialize_timing command, and disabled as soon as the global routing has been done. Usually, the budget_physical command is run before the physical partitioning. However, for incremental modification, the budget command might also be run after the physical partitioning or after the block placement. FIG. 31 illustrates an incremental scenario. Note the budgeting run during the 10th step is incremental, because the global budgeting run during the 4th step set the budgeted attribute on all the budgeted instances (if the user had cleared all the budgeted attributes before step 10, then the budgeting done in step 10 would have been global).

Note finally that the budget_physical command first automatically extracts the parasitics if those are not yet extracted, or no longer valid.

2.4 Reporting Budget

The allocated budgets can be checked with the help of the following new command:

report_budget

The report_budget command reports those paths which are violating a timing constraint because of some fixed delay.

The report_budget command is enabled as soon as the user budgets the design with the budget command.

The report_budget command first automatically extracts the parasitics if those are not yet extracted, or no longer valid.

2.5 Reporting Timing Congestion

The Timing Congestion is reported with the help of the following command:

report_timing_congestion [-logical<cellName>-physical<blockName>IJ -tolerance<toleranceValue>

According to the user-specified argument, the ratio of congested flexible arc delays on the total number of flexible arc delays for each of the logical cell, or for each of the physical blocks is reported. An arc will be considered as congested as soon as the difference between the budgeted arc delay and the model arc delay is greater than tolerancevalue. By default tolerancevalue is null, but may be set by the user/designer. Both cellName and blockName are set up to accept wild cards.

The report_timing_congestion command is enabled as soon as the user budgets the design with the budget command.

The report_timing_congestion command first automatically extracts the parasitics if those are not yet extracted, or no longer valid.

2.6 Time Budgeting

The time budgeting is done with the help of the following command:

budget_time

The goal of the final budgeting is to redistribute both the positive and the negative slack after the global routing with buffer insertion has been run. The budget_time command is enabled as long as the global routing are available. Reasons for running the final budgeting include:

(1) to analyze the timing and report the timing congestion, taking into account the real net delays of the top level interconnect; and (2) to generate budgeted synthesis script in case the designer wants a concurrent implementation approach.

2.7 Setting Dont_touch Attribute

The user set dont_touch attribute with the help of the following command:

set dont_touch<instName>

Any gate level netlists are by default considered as dont_touch. Dont_touch instances are not budgeted by the budget command.

2.8 Clearing Dont_touch Attribute

The user clear dont_touch attribute with the help of the following command:

clear dont_touch<instName>

2.9 Clearing Budgeted Attribute

The budgeted attribute is automatically set by the budget command in order to allow incremental budgeting. That attribute is cleared with the help of the following command:

clear budget<instName>

2.10 Specifying the Maximum Top Level Path Length

Consider a path-length defined as the length of a timing path and a top_level_path_length defined as the portion of the length of a timing path spent on the top level nets belonging to that path (If the path does not contain any top level net, top_level_path_length of that path is null; if the path contains several top level nets, top_level_path_length is the sum of the delays of the different top level nets belonging to that path). Also consider worst_top_level_path_length to be defined as the worst top_level_path_length of any timing path in the design. The max_top_level_path_length constrains the worst_top_level_path_length of the design. The max_top_level_path_length can be specified with the help of the following command:

set max_top_level_path_length<delay Value>

That value is used by the budget command.

2.11 Specifying the Budget Output Driver

The type of gate driving an input terminal of a cell is specified with the help of the following command:

set budget_output_driver<cellName>

That directive is used by the "write synthesis flow" command.

2.12 Specifying the Budget Global Fanout

The type of gate driving an input terminal of a cell may be specified with the following command:

set budget_output_driver<cellName>

That directive is used by the "write synthesis flow" command. The default is the fastest two input nand gate.

2.13 Specifying the Budget Global Fanout

The computation of the load of an output terminal is somehow dependent upon the value of a global budget_fanout value specified by the user with the help of the following command:

set budget_fanout<fanout Value>

That directive is used by the "write synthesis flow" command. The default is "4".

2.14 Specifying the Library Average Input Terminal Load

The library average input terminal load is user-specified with the help of the following command:

set budget_input_capacitance<capacitanceValue>

That directive is used by the "write synthesis flow" command. The default is the input load of the fastest two input nand gate.

2.15 Saving Top Level Interconnect Delay

Top Level Interconnect delays can be saved as a whole within a Standard Delay Format (SDF) with the help of the following command:

write top_level_interconnect_delay<[sdf]fileName>

The default fileName is the name of the top level cell of the design. The generated file contains an entry for any buffered top level node, or for any resistive top level node. Purely capacitive top level nodes are not listed in the generated SDF file.

This command is enabled as soon as the global routing has been run.

2.16 Saving Top Level Interconnect Parasitics

Top Level Interconnect Capacitance can be saved as a whole within a Reduced Standard Parasitic Format (RSPF) file with the help of the following command:

write top_level_interconnect_parasitics<[rspflfileName>

The default fileName is the name of the top level cell of the design.

This command is enabled as soon as the block placement has been run. As long as the global routing is not done, the top level interconnect parasitics are estimated by a block center to block center Steiner tree estimation. As soon as the global routing has been done, the estimation is based on the global routing results.

2.17 Saving Wire Load Models

The different wire load models to be used inside the different physical blocks can be generated with the help of the following command:

write wireloadmodel<[tlflfileName>

Default filename is the name of the top level cell of the design.

2.18 Saving the NON BUDGETED Top Level Constraint File

Top Level constraint file, containing all the user specified constraints as well as directives to use correct wireloadmodel for the different pieces of the design can be saved with the help of the following command:

write top_level_synthesis_script<[cmd]fileName>

The generated file will keep track of any necessary command to be run within a synthesis tool, including:

(1) loading the RTL design;

(2) synthesizing the design;

(3) uniquification directives (4) opening a tlf file containing the wireloadmodels;

(5) opening an ATC file containing constrains and wireloadmodel directives;

(6) opening the interconnect delay file; and (7) opening the interconnect RSPF file.

2.19 Saving the BUDGETED Instance Constraint File

The budgeted Constraint file can be saved via the following command:

write synthesis_script

2.20 Setting Critical Block Size

The Critical block size is set with the help of the following command:

set critical_block_size<gateEquivNumber>

The default is 100K gate.

The present invention may be conveniently implemented using a conventional general purpose or a specialized digital computer or microprocessor programmed according to the teachings of the present disclosure, as will be apparent to those skilled in the computer art. However, in computationally intensive applications such as circuit design (for ASIC, FPGA's, etc), faster processing is advantageous.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMs, microdrive, and magneto-optical disks, ROMS, RAMS, EPROMS, EEPROMS, DRAMS, VRAMS, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, each of the processes discussed herein and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method of determining a budgeted floorplan of a circuit, comprising the steps of:

initializing timing of said circuit;

performing a physical budgeting of said circuit;

partitioning said circuit into blocks of gates;

identifying placement of said blocks; and budgeting time to each of said blocks;

wherein:

said step of initializing timing comprises the steps of, creating a set of flexible timing models from a high level description of said circuit, and creating a set of general constraints that apply to said circuit; and wherein said step of creating a set of flexible timing models comprises the steps of;

developing an un-optimized netlist from said high level description, and producing a set of logic cones, each logic cone representing a set of gates from the un-optimized netlist and identifying timing arcs (paths) defined by the set of gates.

2. The method according to claim 1, wherein said high level description is at least on of RTL, Verilog, or other high level circuit language describing said circuit.

3. The method according to claim 1, wherein said step of performing a physical budgeting comprises distributing available timing across components of said circuit, including the steps of, distributing positive slack in each of said cones to each of congested arcs in the cones, distributing positive slack (within a cone)to each of flexible arcs in the cone, and reclaiming negative slack (within a cone) from each of frozen arcs in the cone.

4. The method according to claim 3, wherein said step of distributing positive slack comprises the steps of:

setting budgeted arc delays within each cone to zero;

setting arc weights as a function of a fastest implementation of a flexible part of each cone;

propagating timing via an arrival time propagation method;

propagating arc weights;

detecting congested cones;

distributing slack in congested cones; and updating weights in congested cones.

5. The method according to claim 1, wherein said step of performing a physical budgeting comprises distributing available timing across components of said circuit using the set of flexible timing models.

6. The method according to claim 5, wherein said step of distributing available timing includes the steps of:

distributing positive slack in each of said flexible timing models to each of congested arcs in the models;

distributing positive slack to each of flexible arcs in the models; and reclaiming negative slack from each of frozen arcs in the models.

7. The method according to claim 1, wherein said step of partitioning comprises the steps of:

minimizing a number of timing paths traversing more than one of said blocks; and limiting block ownership of timing critical paths.

8. The method according to claim 1, wherein said step of partitioning comprises performing a timing driven block partitioning on said circuit.

9. The method according to claim 8, wherein said timing driven block partitioning comprises:

determining parasitics of a critical block size;

calculating gate delay and flexible model delay as a function the parasitics; and using the calculated gate delay and flexible model delay, enclosing sets of interconnected critical paths of said circuit into a same physical block sized less than said critical block size.

10. A method of determining a budgeted floorplan of a circuit, comprising the steps of:

initializing timing of said circuit;

performing a physical budgeting of said circuit:

partitioning said circuit into blocks of gates;

identifying placement of said blocks; and budgeting time to each of said blocks;

wherein said step of identifying placement of said blocks comprises the steps of:

estimating parasitics based on the block partitioning of said circuit;

calculating gate delay and flexible model delay as a function the parasitics;

calculating net weights from said gate delay and flexible model delay calculations; and placing said blocks based on an amount of net weight associated with each block, such that blocks having less net weight are placed closely or at faster locations, while blocks having higher net weight (can be further optimized) are placed further apart.

11. The method according to claim 10, further comprising the steps of:

routing between blocks; and placing i/o devices relative to said blocks.

12. The method according to claim 11, wherein said steps of routing and placing i/o devices includes the steps of:

estimating parasitics based on the block placement of said circuit;

calculating gate delay and flexible model delay as a function the parasitics;

creating a timing budget for an inter-block net based on a flexibility of paths containing the net; and performing at least one of block terminal assignment, channel compaction, and net buffering using said timing budget.

13. The method according to claim 10, wherein said step of budgeting time comprises:

estimating parasitics based on a global routing of said circuit;

calculating gate delay and flexible model delay as a function the parasitics;

determining available time based on the calculated gate delay and flexible model delays; and allocating said available time across each block of said circuit.

14. The method according to claim 10, further comprising the step of verifying timing of said circuit after at least one of the preceding steps.

15. The method according to claim 14, wherein said step of verifying further comprises the step of:

if said timing verification indicates that a current stage of said floorplan design is not feasible considering said timing verification compared to said set of general constraints, then, modifying at least one of said high level description of said circuit and said general constraints, and re-executing one or more of the steps immediately preceding said timing verification.

16. A computer readable media and a set of instructions stored by the computer readable media that, when loaded into a computer, cause the computer to perform the steps of:

initializing timing of said circuit;

performing a physical budgeting of said circuit;

partitioning said circuit into blocks of gates;
identifying placement of said blocks; and
budgeting time to each of said blocks;
wherein:
   said step of initializing timing comprises the steps of,
      creating a set of flexible timing models from a high level description of said circuit; and
      creating a set of general constraints that apply to said circuit; and
   said stop of creating a set of flexible timing models comprises the steps of:
      developing an un-optimized netlist from said high level description;
      producing a set of logic cones, each logic cone representing a set of gates from the un-optimized netlist and identifying timing arcs (paths) defined by the set of gates.

17. The method according to claim 16, wherein:

said method is embodied in a set of computer instructions stored on a computer readable media;

said computer instructions, when loaded into a computer, cause the computer to perform the steps of said method.

18. The method according to claim 17, wherein said computer instruction are compiled computer instructions stored as an executable program on said computer readable media.

* * * * *